United States Patent [19]

Takahashi

[11] Patent Number: 4,764,102

[45] Date of Patent: Aug. 16, 1988

[54] CONTINUOUS ELONGATE CERAMIC ARTICLE MANUFACTURING SYSTEM

[75] Inventor: Ryuichi Takahashi, Yamagata, Japan

[73] Assignee: IG-Technical Research Inc., Japan

[21] Appl. No.: 4,054

[22] Filed: Jan. 16, 1987

[30] Foreign Application Priority Data

| Apr. 22, 1986 [JP] | Japan | 61-94227 |
|---|---|---|
| Sep. 10, 1986 [JP] | Japan | 61-214961 |
| Sep. 11, 1986 [JP] | Japan | 61-215073 |
| Sep. 20, 1986 [JP] | Japan | 61-222303 |

[51] Int. Cl.⁴ .............................................. B28B 21/52
[52] U.S. Cl. ............................... 425/466; 219/10.55 R; 425/467
[58] Field of Search ............... 425/466, 467, 290; 219/10.55 R, 10.55 A, 10.55 D, 10.55 F

[56] References Cited

U.S. PATENT DOCUMENTS

| 658,534 | 9/1900 | Stripe | 425/290 |
|---|---|---|---|
| 1,248,963 | 12/1917 | Webber | 425/466 |
| 2,682,081 | 6/1954 | Fisch | 425/467 |
| 3,957,522 | 5/1976 | Matsuo et al. | 264/87 |
| 4,013,403 | 3/1977 | Petrus | 432/122 |
| 4,183,760 | 1/1980 | Funk et al. | 501/144 |
| 4,289,945 | 9/1981 | Kristof | 219/10.55 R |
| 4,374,079 | 2/1983 | Fouss et al. | 425/290 |
| 4,495,118 | 1/1985 | Ikami | 264/148 |
| 4,496,501 | 1/1985 | Linke et al. | 425/72 R |
| 4,527,974 | 7/1985 | Carraroli et al. | 432/128 |
| 4,626,641 | 12/1986 | Brown | 219/10.55 E |
| 4,665,626 | 5/1987 | Berkmann et al. | 34/1 |

FOREIGN PATENT DOCUMENTS

| 1324971 | 3/1963 | France | 264/209 |
|---|---|---|---|
| 1529165 | 10/1978 | United Kingdom | 83/53 |

*Primary Examiner*—Charles Hart
*Attorney, Agent, or Firm*—Stefan J. Klauber

[57] ABSTRACT

A continuous elongate ceramic article manufacturing system capable of continuously manufacturing elongate ceramic articles having a predetermined length by continuously extruding a clay material containing clays as the principal components in a hollow or solid continuous strip, drying strip in a short time, firing the dried continuous strip, and cutting the fired continuous strip in the predetermined length. The system comprises a continuous arrangement of an extruder, a drying machine, a cutter, and a firing furnace arranged in that order, or a continuous arrangement of an extruder, a drying machine, a firing furnace, and a cutter arranged in that order.

16 Claims, 19 Drawing Sheets

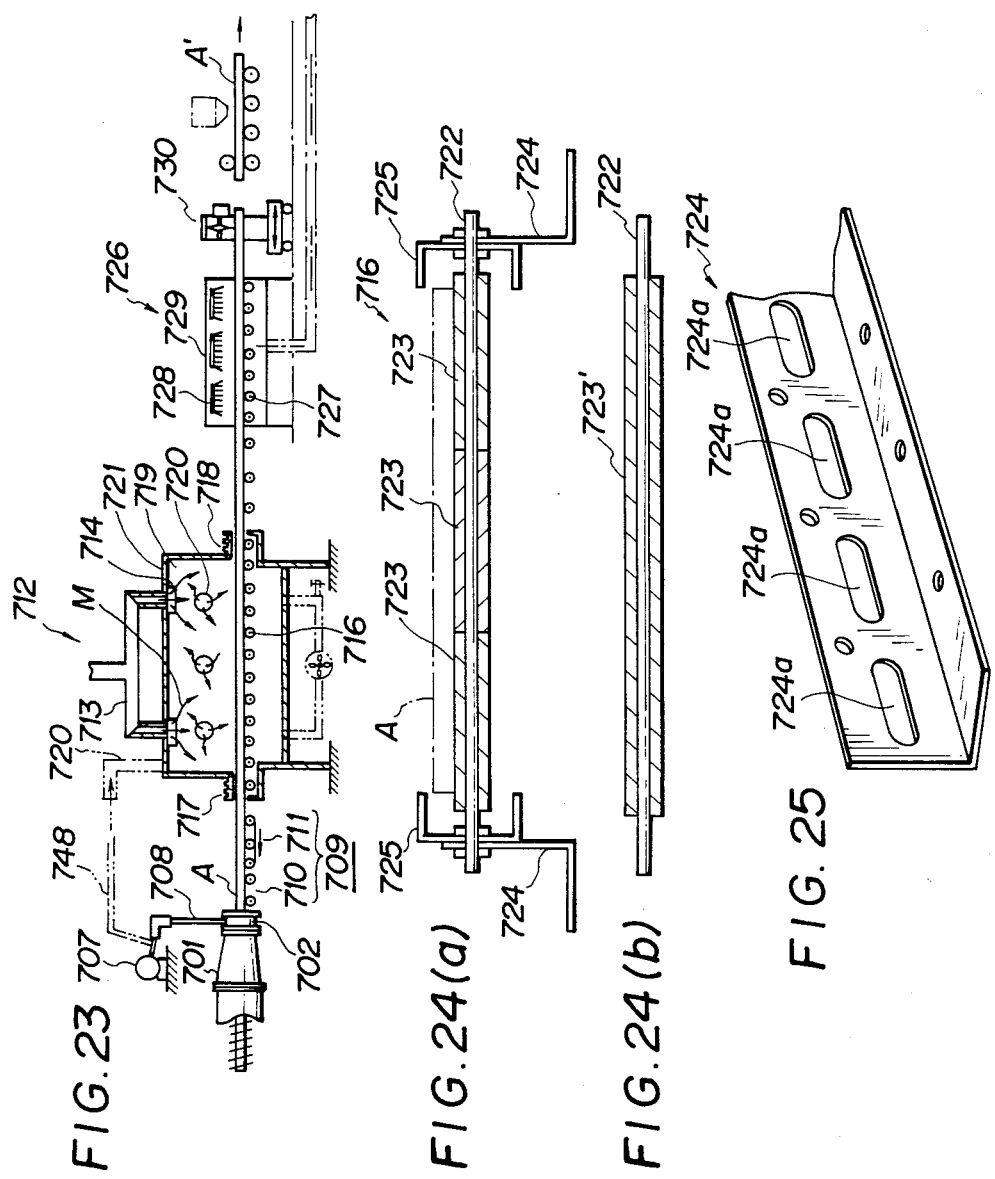

CONTINUOUS ELONGATE CERAMIC ARTICLE MANUFACTURING SYSTEM

BACKGROUND OF THE INVENTION

1. Field of the Invention

The present invention relates to a continuous elongate ceramic article manufacturing system which manufactures ceramic articles through a series of continuous processes by continuously extruding a material containing clay as the principal component in a continuous, hollow or solid strip, drying the strip in a short time on the order of one to thirty minutes, cutting the dried strip into pieces of a fixed length, and firing the cut pieces to produce elongate ceramic articles.

2. Description of the Prior Art

As is well known, ceramic articles are manufactured through a series of an extruding process, a cutting process, a drying process, and a firing process. For example, tiles are manufactured through independent processes of extruding a material by an extruder in a continuous strip, cutting the strip in a fixed length, pressing the cut pieces in a fixed shape, drying the shaped pieces and firing the shaped and dried pieces, or pressing a material in a die in a fixed shape, drying the shaped pieces and firing the shaped and dried pieces.

However, the shaped pieces are plastic, it is very difficult to convey the shaped pieces without distorting the same. Elongate pieces, hollow pieces or thin pieces, in particular, are distorted easily, and hence it has been almost impossible to convey elongate pieces, hollow pieces and thin pieces continuously extruded by an extruder to the subsequent processes for drying and firing without distorting the same.

The drying process and the firing process, as well as the forming process, have difficulties in manufacturing ceramic articles. That is, first, drying and firing ceramic articles require a long time as long as several days to one week and, secondly, the shaped pieces deform greatly in the drying and firing processes. Hollow pieces, in particular, deform greatly as compared with solid pieces because the external surface is dried more rapidly than the internal surfaces defining the hollows when only the external surface is heated, and thereby the yield of the drying process is reduced.

Thus, the conventional ceramic article manufacturing system has drawbacks that the drying and firing process requires a long time of one to two days to prevent the shaped plastic pieces from twisting or cracking deteriorating the productivity of the manufacturing system and increasing the cost of the product. Furthermore, the conventional continuous ceramic article manufacturing system inevitably has a very long production arrangement because the drying and firing processes require a long time, hence such a very long production arrangement hardly is of a continuous ceramic article manufacturing system and it is impossible to dry and fire individual pieces separately because of the economy of cost and space. Accordingly, different from small clay pieces which are piled up with spacers therebetween for drying and firing, an elongate strip or plate is difficult to handle, and hence it has been impossible to manufacture a satisfactory elongate ceramic article at a reasonable cost due to problems resulting from the temperature difference between the central portion and the peripheral portion of the elongate strip or plate in the preheating zone, the firing zone and the cooling zone. Accordingly, it has never been thought of continuously drying elongate strips of one to three meters in length in a short time on the order of one to thirty minutes to constitute a ceramic article manufacturing system including the firing process in a short straight production line.

SUMMARY OF THE INVENTION

Accordingly, it is an object of the present invention to provide a continuous elongate ceramic article manufacturing system comprising a continuous arrangement of a forming process, a drying process, a cutting process and a firing process, including improved extruding and drying machines remarkably saving the drying time, and capable of manufacturing uniform and satisfactory elongate ceramic articles irrespective of the shape, whether they are hollow or solid, and size.

The above and other objects, features and advantages of the present invention will become apparent upon reading the following description in conjunction with the accompanying drawings.

BRIEF DESCRIPTION OF THE DRAWINGS

FIG. 23 is a fragmentary view of a continuous elongate ceramic article manufacturing system, in a thirteenth embodiment, according to the present invention;

FIGS. 24(a) and 24(b), and FIG. 25 are sectional views and a perspective view, respectively, of a principal member of the conveying unit of a microwave-heating machine;

DESCRIPTION OF THE PREFERRED EMBODIMENTS

First, the combination and arrangement of the component machines of a continuous elongate ceramic article manufacturing system and the general constitution of the same will be described with reference to FIG. 1.

Figure 1:
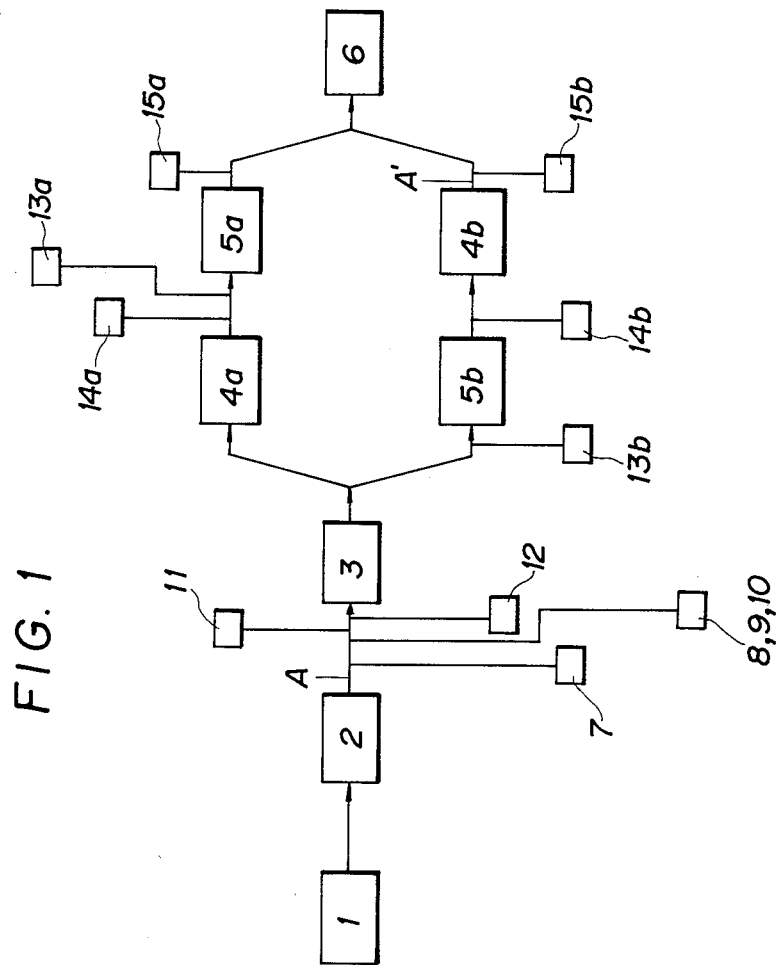
FIG. 1 is a block diagram of assistance in explaining the basic constitution of a continuous elongate ceramic article manufacturing system according to the present invention.

In FIG. 1, indicated at 1 is material and at 6 is an ceramic article. Basically, a continuous elongate ceramic article manufacturing system is constituted of machines arranged in either of two kinds of sequential arrangement, namely, a sequential arrangement of a vacuum extruder or an ordinary extruder (hereinafter referred to simply as "extruder") 2, a drying machine 3, a cutting machine 4a and a firing furnace 5a, or a sequential arrangement of the extruder 2, the drying machine 3, a firing furnace 5b and a cutting machine 4b. A perforating machine 7, a spreading machine 8, a rolling machine 9, edge cutting machine 10, a heater 11, a straightening machine 12, a glazing machine 13a or 13b, a conveying machine 14a or 14b, a conveying and delivering machine 15a or 15b are incorporated properly to the former or the latter basic sequential arrangement.

Several typical continuous elongate ceramic article manufacturing systems will be described hereinafter with reference to preferred embodiments of the present invention.

Figure 2:
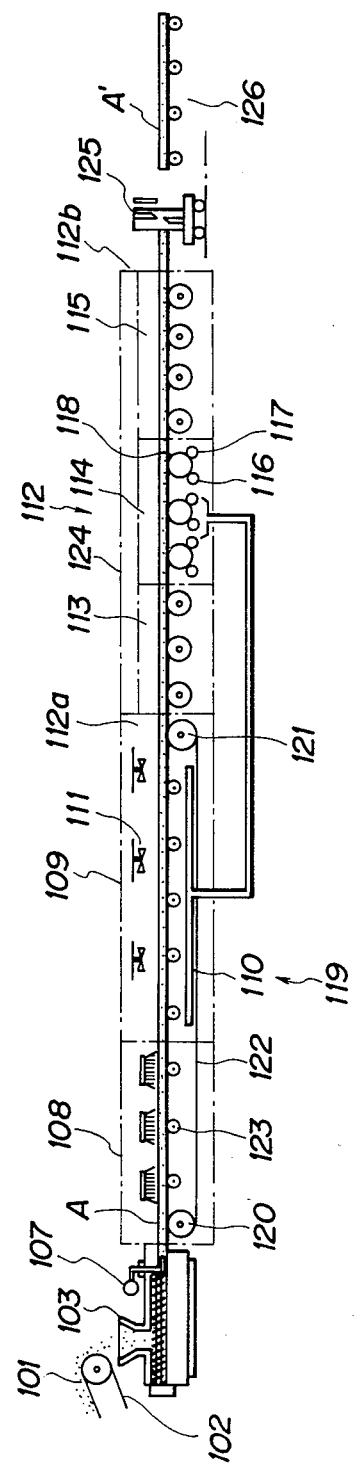
FIG. 2 is a schematic side elevation of a continuous elongate ceramic article manufacturing system, in a first embodiment, according to the present invention.
Figure 3A:
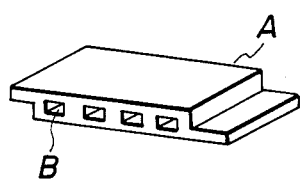
FIGS. 3(a), 3(b) and 3(c) are perspective views of portions of extruded strips, respectively.
Figure 3B:
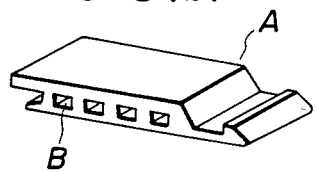

First Embodiment (FIGS. 2 to 7):

Referring to FIG. 2, clay 101 corresponding to the material 1 in FIG. 1 is prepared by mixing and kneading several kinds of materials and chamotte by a kneading machine (not shown) and is supplied to an extruder 103 corresponding to the extruder 2 in FIG. 1 by a belt conveyor 102. The extruder 103 extrudes the clay 101 through a nozzle 104 and a lattice core 105 in a continuous strip having a shape, for example, as illustrated in FIG. 3(a) or 3(b). Since the clay 101 is a mixture mostly of natural substances, the composition thereof is specific to the place of origin of the components. Therefore, the clay 101 having desired properties is prepared by mixing various clays complementing each other. The clay 101 is prepared, for example, by kneading water and a mixture of crushed materials such as pottery stone, feldspar, kaolinite, halloysite, pyrophillite, quartz, Kibushi clay, Gairome clay and, when necessary, alumina and zirconia. The clay 101 is removed of iron matters by a magnet.

Figure 4:
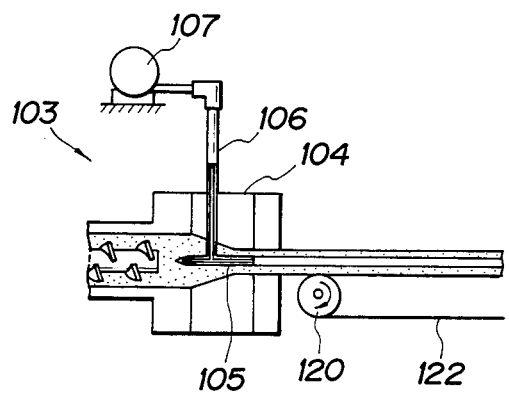
FIG. 4 is a schematic sectional view of the extruding head of an extruder showing a core incorporated into the extruder.
Figure 5A:
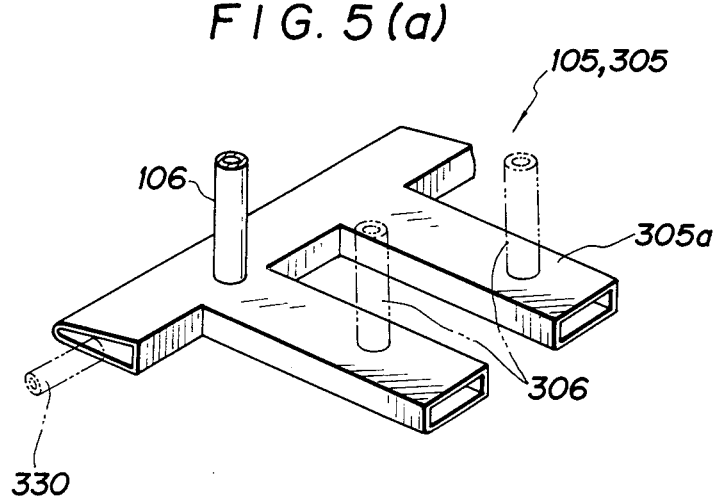
FIGS. 5(a) and 5(b) are perspective views of cores, respectively.
Figure 5B:
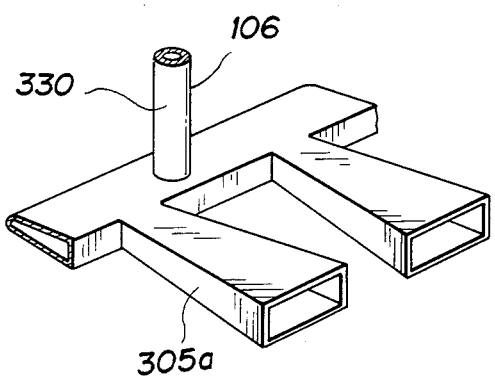

The lattice core 105 is a hollow member having a longitudinal section corresponding to the shape, for example, a square shape, of the hollow B of a continuous strip A to be extruded. As illustrated in FIGS. 4, 5(a) and 5(b), a pipe 106 having one end connected to a variable capacity pump 107 is connected at the other end to the rear end of the core 105 to reduce drying time by a great extent through the forced ventilation of the hollows B of the continuous strip A. For example, dry hot air of 20° to 160° C. in temperature and 0 to 30% in humidity is circulated through the hollows B so that the continuous strip A is dried uniformly.

An infrared-ray heater 108 corresponding to the heater 11 of FIG. 1 dries the continuous strip A throughout, namely, from the central portion to the surface of the continuous strip A by far infrared rays, within a short time. The infrared-ray heater 108 reduces the moisture content of the continuous strip A, for example, from a value in the range of 15 to 25% to a value in the range of 10 to 5% to enhance the shape retentivity of the continuous strip A.

Figure 6:
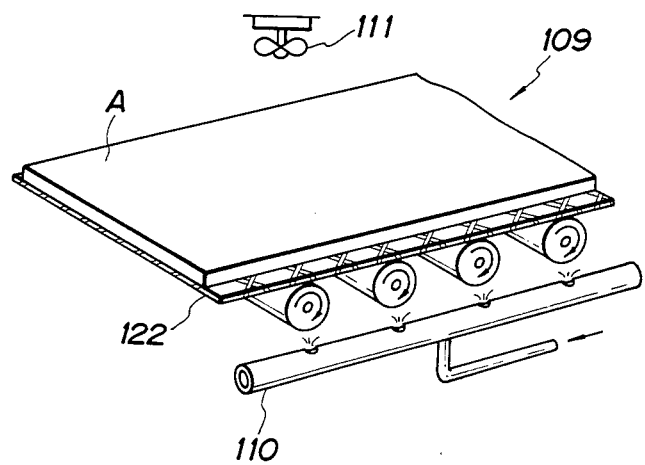
FIG. 6 is a fragmentary perspective view of a drying machine.

A drying machine 109 corresponding to the drying machine 3 of FIG. 1 heats the continuous strip A at a temperature in the range of 90° to 400° C. to further reduce the water content of the continuous strip A, for example, to 5 to 0%. Hot air heated by the waste heat of a firing furnace 112 corresponding to the firing furnace 5b of FIG. 1 is blown through a pipe 110 against the continuous strip A and is stirred by a fan 111 as shown in FIG. 6 to heat the interior of the drying machine 109 uniformly and to promote the evaporation of water.

Figure 7:
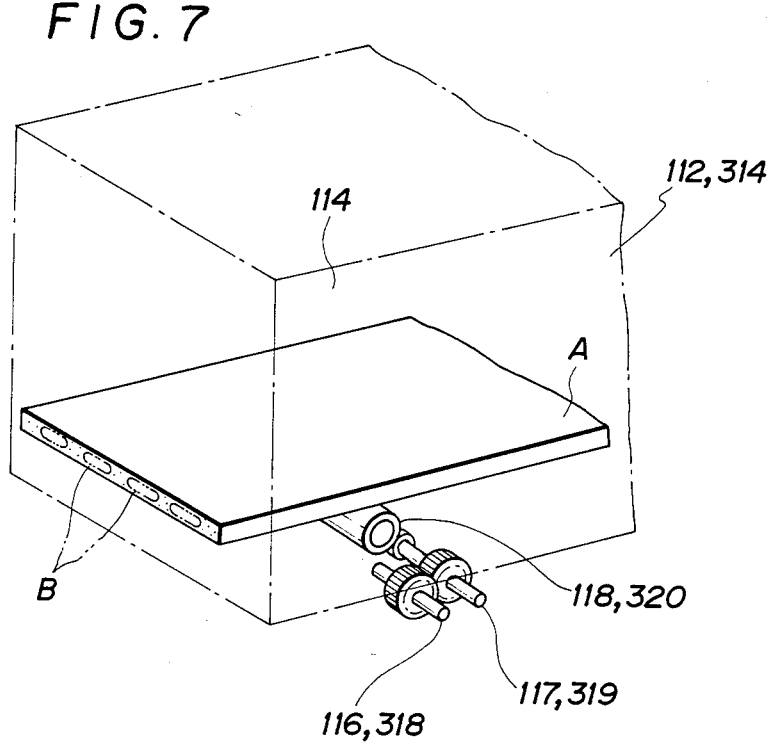
FIG. 7 is a fragmentary perspective view of a firing furnace.

Temperature distribution in the firing furnace 112 is represented by an upward convex curve with respect to the direction from the entrance 112a to the exit 112b. The interior of the firing furnace 112 is divided substantially into a preheating zone 113 of 150° to 700° C., a firing zone 114 of 800° to 1350° C., and a cooling zone 115 of 600° to 100° C. Naturally, the respective temperatures of these zones are determined selectively so as to meet firing conditions specific to the type and composition of the clay 101, and these zones 113, 114 and 115 are not necessarily demarcated distinctly in respect of temperature; these zones 113, 114 and 115 are substantial divisions in a continuous firing process. Kerosene or an inflammable gas, such as LPG, is burnt in the firing furnace 112 to fire the continuous strip A. Burners (not shown) are disposed in the firing furnace 112 in an appropriate arrangement so that the preheating zone 113, the firing zone 114 and the cooling zone 115 are substantially demarcated in the firing furnace 112. In the firing furnace 112, the continuous strip A is conveyed by a conveying device employing a mesh wire belt, metallic rollers or ceramic rollers. Particularly, since the temperature in the firing zone 114 rises up to 1300° C., high-alumina ceramic rollers 118 each is mounted on a pair of parallel metallic rollers 116 and 117 as shown in FIG. 7 for conveying the continuous strip A to prevent heat being transmitted through the conveying device to the driving unit.

A conveying machine 119 comprises, for example, driving wheels 120, driven wheels 121, a mesh wire belt 122 extended between the driving wheels 120 and the driven wheels 121, and a plurality of free supporting rollers 123 arranged between the driving wheels 120 and the driven wheels 121. The conveying machine 119 is extended through the heater 108 and the drying machine 109. The linear path of the continuous strip A is covered with a heat insulating cover 124. The walls of the firing zone 114 of the firing furnace 112 are formed of refractory bricks or ceramic fibers. The continuous strip A is passed continuously and linearly through the firing zone 114. The firing furnace 112 is provided with ventilating dampers in an appropriate arrangement.

A moving cutter 125 corresponding to the cutting machine 4b of FIG. 1 cuts the continuous strip A into elongate ceramic plates A' of a fixed length. A conveying and delivering machine 126 corresponding to the conveying and delivering machine 15b of FIG. 1 conveys the elongate ceramic plates A' at a speed higher than the delivery speed of the firing furnace 112 to separate the elongate ceramic plates A' from the continuous strip A.

Free supporting rollers or conveyor belts (not shown) are disposed between the heater 108 and the drying machine 109 and between the drying machine 109 and the firing furnace 112 so that the continuous strip A is conveyed normally without drooping between the heater 108 and the drying machine 109 and between the drying machine 109 and the firing furnace 112.

In operation, the material clay 101 is prepared by kneading a mixture of 61.5% wt natural clay, 20% wt chamotte, 0.5% wt water reducing agent ("SEL-FLOW", Daiichi Kogyo Seiyaku K.K.) and 18% wt water by a clay kneader ("Type MP-100", Miyazaki Tekko K.K.). The extrusion capacity of the extruder ("Type MV-FM-A-1", Miyazaki Tekko K.K.) is 100 to 150 l/hr. The pump 107 is an exhaust pump driven by a 2 HP motor. The heater 108 has twenty sets of far infrared-ray panel heaters of 4 to 400 μ wavelength arranged in a space of 10 m in length. The heater 108 is capable of causing moisture contained in the continuous strip A to diffuse from the surface for rapid drying, and capable of reducing the water content of the continuous strip A to 10%. The drying machine 109 raises the temperature of the continuous strip A up to 200° to 300° C. while the continuous strip A is conveyed for about 10 to 30 m. In this embodiment, the capacity of the drying machine 109 is 300° C.×10 m. In the firing furnace 112, the continuous strip A is heated from 150° to 800° C. in the 8 m long preheating zone 113, and from 800° to 1300° C. in the 5 m long firing zone 114, and then is cooled from 1300° to 100° C. in the 8 m long cooling zone 115. The traveling speed of the continuous strip A is 0.1 to 2 m/min. The mesh wire belt 122 is extended through the heater 108 and the drying machine 109. Stainless steel rollers are provided in the preheating zone 113 and the cooling zone 115 as conveying means, while alumina rollers are provided in the firing zone 114 as conveying means. The path along which the continuous strip A is conveyed is horizontal. The moving speed of the continuous strip A corresponds to the extruding speed. The material clay 101 is supplied by the belt conveyor 102 to the vacuum extruder 103. The continuous strip A having a cross section as illustrated in FIG. 3(a) extruded by the vacuum extruder 103 is conveyed by the mesh wire belt 122 into the heater 108. The heater 108 reduces the water content of the continuous strip A to about 10%, and then the drying machine 109 reduces the water content of the continuous strip to 5 to 0%. Then, the continuous strip A is preheated, fired and cooled in the firing furnace 112 to form a continuous ceramic strip. Then, the continuous ceramic strip is cut into longate ceramic plates A' having a fixed length, for example, 2424 mm, 3030 mm or 3636 mm by the moving cutter 125.

It is understood that the above-described embodiment is merely illustrative of the application of the principles of the present invention, and it is possible to provide a glazing machine (glazing machine 13b of FIG. 1) between the drying machine and the firing furnace.

The continuous elongate ceramic article manufacturing system, in the first embodiment, according to the present invention described hereinbefore is capable of producing a continuous strip of clay in a short time at a high speed by extruding the clay in a continuous strip, reducing the water content of the continuous strip, drying the continuous strip, firing the continuous strip and cooling the continuous strip through processes arranged along a straight processing line. Since an infrared-ray heater and hot air heated by waste heat are used and the hollows B of the continuous strip A are ventilated to reduce the water content of the continuous strip A, the water content of the continuous strip A can be reduced smoothly in a short time at a low cost. Thus, the continuous elongate ceramic article manufacturing system of the present invention enables highly efficient mass-production of such a continuous strip. Furthermore, the fired continuous ceramic strip may be cut into elongate ceramic plates having an optional length. Therefore, the distortion of the elongate ceramic plates due to shrinkage resulting from firing, particularly, dimensional errors due to longitudinal shrinkage, which has been the defect of ceramics, can be eliminated.

Second Embodiment (FIGS. 8(a) 8(b) to 10 and FIG. 3(c)):

The second embodiment is substantially the same as the first embodiment except that a perforating machine 130 corresponding to the perforating machine 7 of FIG. 1 and a glazing machine 131 corresponding to the glazing machine 13b of FIG. 1 are incorporated additionally to the system.

Figure 3C:
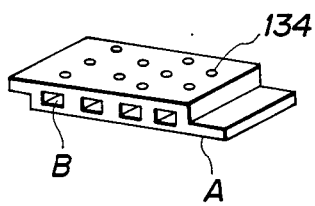
Figure 8A:
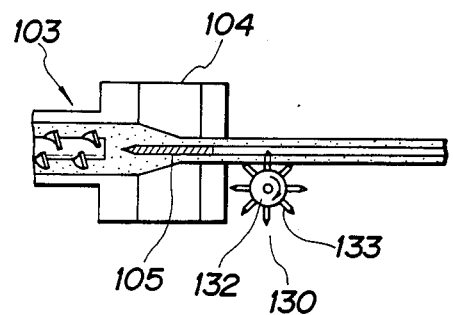
FIG. 8(a) is a partly sectional fragmentary side elevation showing a perforating machine disposed adjacent to the extruder in a second embodiment.
Figure 8B:
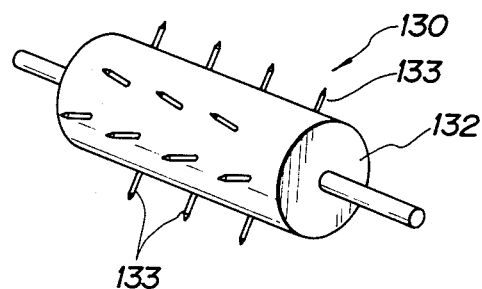
FIG. 8(b) is a perspective view of a perforating roller.

As illustrated in FIG. 8(a), the perforating machine 130 is disposed next to the vacuum extruder 103. As illustrated in FIG. 8(b), the perforating machine 130 has a perforating roller 132 provided on the circumference thereof with spikes 133 arranged at appropriate axial and circumferential intervals. The perforating roller 132 is rotated at a rotating speed corresponding to the extruding speed of the vacuum extruder 103 to form ventilating holes 134 only in the backside of a continuous strip A extruded by the vacuum extruder 103, as illustrated in FIG. 3(c). The ventilating holes 134 promote reducing the drying time in circulating air through the hollows B of the continuous strip A. The size of the spikes 133 of the perforating roller 132 is, for example, 2 mm in diameter and 5 mm in height.

Figure 9:
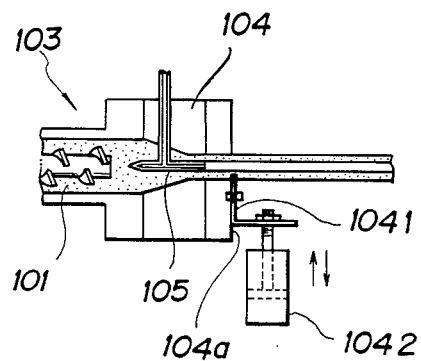
FIG. 9(a) is a partly sectional fragmentary side elevation showing another perforating machine disposed adjacent to the extruder in the second embodiment.
FIG. 9(b) is a fragmentary perspective view of the perforating machine.
Figure 9B:
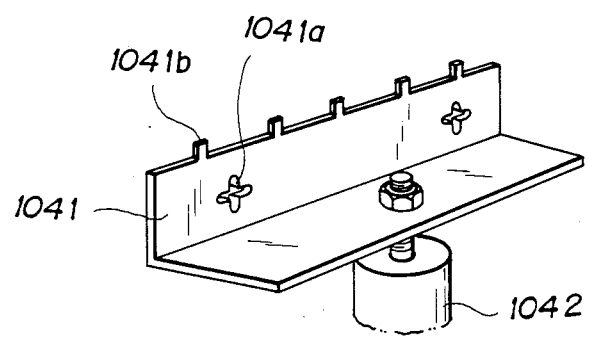

Furthermore, the perforating machine 130 may employ a perforating plate 1041 having perforating teeth 1041b longitudinally arranged at intervals as illustrated in FIGS. 9(a) and 9(b). The perforating plate 1041 is driven for vertical reciprocatory motion in front of the front end 104a of the nozzle 104 by vertically reciprocatory driving means 1042. Slots 1041a are formed in the perforating plate 1041 to allow the vertical and lateral movement of the perforating plate 1041 relative to the nozzle 104.

Figure 10:
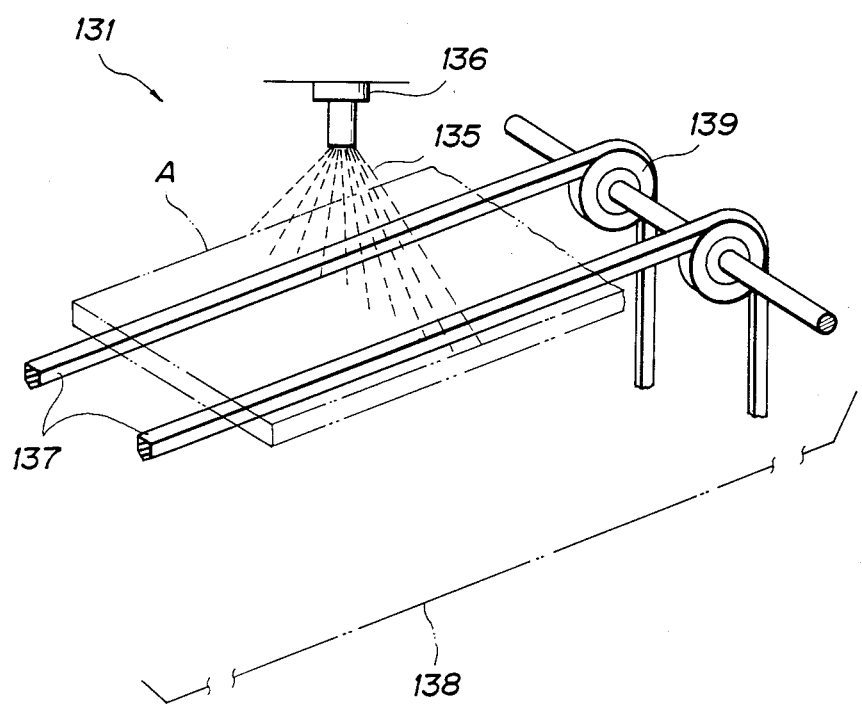
FIG. 10 is a schematic perspective view of a glazing machine.

The glazing machine 131 comprises a glaze applicator 136, such as a spray gun or a flow coater (a spray gun is shown in FIG. 10) for applying a glaze 135, a belt conveyor 137, and a glaze pan 138. The belt conveyor 137 has a plurality of V-belts or the like extended between wheels 139 as illustrated in FIG. 10. The V-belts are those with planar sides.

The second embodiment additionally incorporating the perforating machine 130 and the glazing machine 131 is capable of producing a continuous strip along a straight processing line, in a short time and at a high speed by extruding the clay, reducing the water content of the continuous strip by utilizing the hollows and ventilating holes of the same, applying the glaze, drying the glazed continuous strip, firing the glazed continuous strip, and then cooling the fired continuous strip. Since an infrared-ray heater and hot air heated by waste heat are used and air is circulated through the hollows and ventilating holes of the continuous strip in reducing the water content of the continuous strip, the water content is reduced smoothly in a short time at a low cost. Furthermore, the continuous elongate ceramic article manufacturing system enables highly efficient mass-production of such a continuous strip. Still further, the glazing of the continuous strip can easily be accomplished during the continuous manufacturing process when necessary.

Figure 11:
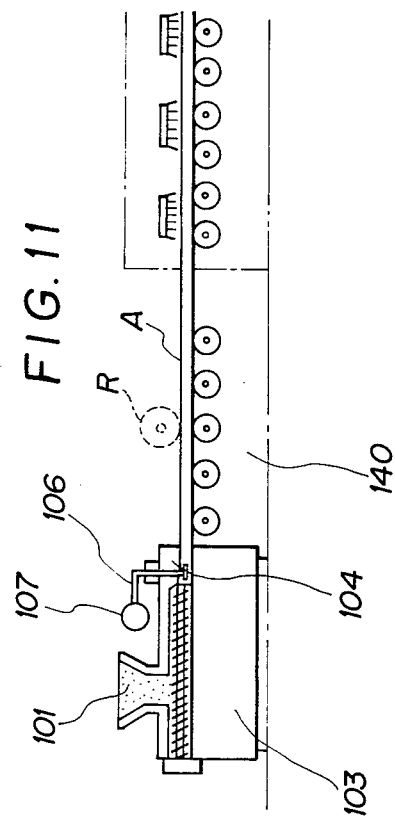
FIG. 11 is a fragmentary side elevation of a continuous elongate ceramic article manufacturing system, in a third embodiment, according to the present invention.

Third Embodiment (FIG. 11):

The third embodiment has a conveying machine 140 employing free supporting rollers, a mesh wire belt, a cloth belt or a steel wire belt between the vacuum extruder 103 and the drying machine 109 instead of the heater 108. Since a continuous strip A as extruded is conveyed by the conveying machine 140, the conveying machine 140 serves as an observation zone for observing the condition of extrusion. The conveying machine 140 may employ embossing rollers R to serve as an embossing process or may employ free supporting rollers to serve as a straightening process.

Further, an infrared-ray heater, a far infrared-ray heater or a microwave-heating device may be employed instead of the drying machine 109 utilizing the waste heat of the firing furnace 112. A far infrared-ray heater is particularly suitable for drying the surface and the central portion of the continuous strip A simultaneously in a short time because the heat rays are highly penetrative when radiated on quartz and kaolin of the clay 101.

The third embodiment has the following features:

(1) Drying the continuously extruded continuous strip from the interior of the same by far infrared rays reduces drying time remarkably from several days to several hours or several minutes.

(2) Drying and firing the continuous strip from the central portion of the same before cutting prevents the continuous strip from bending, cracking and twisting improving the yield of the drying and firing processes.

(3) Rapid drying reduces the drying cost.

(4) Cutting the running continuous strip after the continuous strip has been dimensionally stabilized by drying and firing enables highly accurate cutting.

(5) Short drying time and the preventing the continuous strip from being distorted facilitate the manufacture of elongate ceramic articles.

(6) Elimination of the twisting and cracking of the continuous strip in the drying process and the use of a roller hearth kiln or the like enable the continuous firing of the continuous strip and remarkable reduction of energy consumption and firing time.

Figure 12:
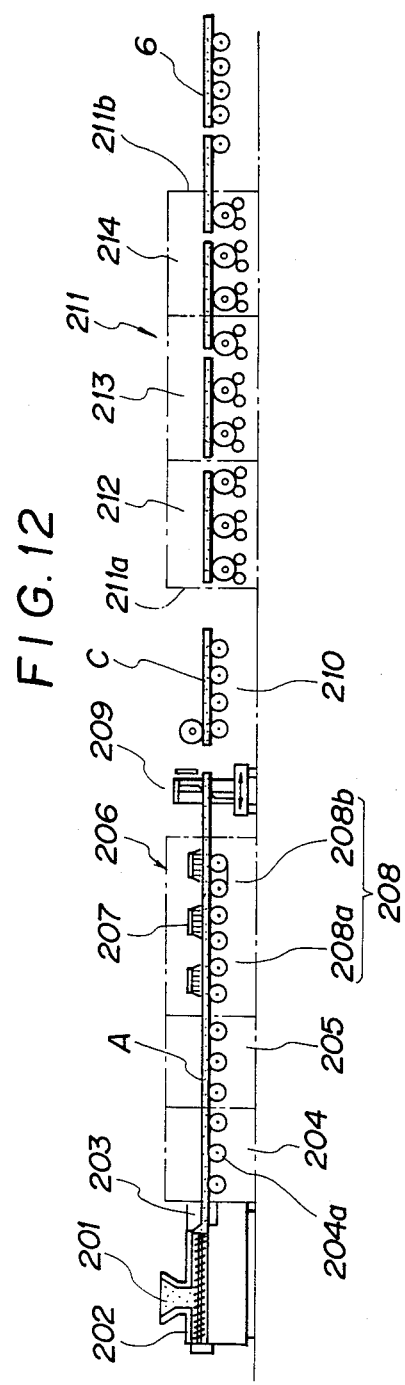
FIG. 12 is a side elevation of a continuous elongate ceramic article manufacturing system, in a fourth embodiment, according to the present invention.
Figure 13A:
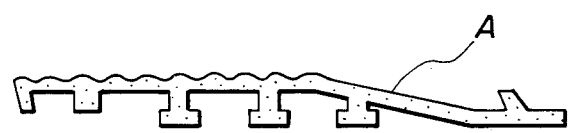
FIGS. 13(a), 13(b), 13(c) and 13(d) are sectional views of extruded strips, respectively.
Figure 13B:
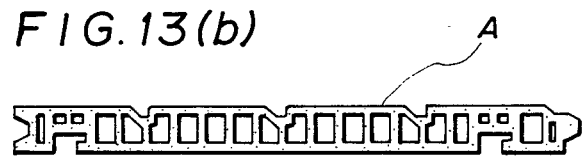
Figure 13C:
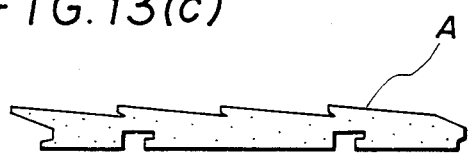
Figure 13D:
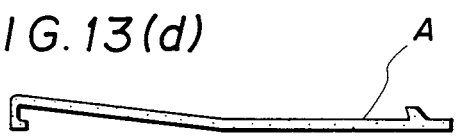

Fourth Embodiment (FIGS. 12, 13(a) to 13(d)):

Referring to FIG. 12, Clay 201, a mixture of several kinds of clays, is extruded continuously in a continuous strip A, for example, through a nozzle 203, by an extruder 202 corresponding to the extruder 2 of FIG. 1. The continuous strip A has a cross section as shown in FIG. 13(a), 13(b), 13(c) or 13(d). The continuous strip A is fed continuously to the next process.

The clay 202 is prepared, for example, by crushing materials such as pottery stone, fedlspar, kaolinite, halloysite, sericite, kibushi clay, Gairome clay, and by adding materials such alumina, zirconia, talc, magnesium carbonate, calcium carbonate, and by mixing a mixture of the crushed materials, water, when necessary, 0.5 to 80% wt or less materials such as chamotte, inorganic fibers (asbestos fibers, glass fibers or calcium silicate fibers), pulp, and 0.01 to 1% wt water reducing agent such as an inorganic deflocculating agent (sodium silicate, sodium phosphate, sodium aluminate or lithium carbonate) and/or organic deflocculating agent (duethyl amine, ethylamine, naphthlene, sulfonic acid, polyvinyl alcohol, carboxymethyl cellulose) by a rough kneading machine.

The nozzle 203 is such a nozzle that will withstand a force that acts thereon in extruding the clay 201 and, when necessary, equipped with a lattice core as shown in FIG. 5. It is possible to connect a device for supplying a fluid heated to a high temperature into and for discharging moisture from the hollows of an extruded continuous strip A to the lattice core in order to dry the continuous strip A uniformly and quickly. A straightening machine 204 has a plurality of parallel free conveyor rollers having smooth circumference extended across the straight conveying path horizontally extending from the nozzle 103 one after another. If the continuous strip A should be extruded somewhat obliquely with respect to the straight conveying path through the nozzle 203, the free conveyor rollers 204a apply frictional resistance against the transverse movement of the continuous strip A to guide the same along the straight conveying path. The synergistic effect of the guiding function of the free conveyor rollers 204a and the conveying function of the conveying machine 5 further enhances the straightening function of the straightening machine 204.

The conveying machine 205 has conveyor rollers, a cloth belt or the like which is driven at a surface speed higher than the moving speed of the continuous strip A, for example, by 0.1 to 5%, to convey the continuous strip A under tension. Thus, the continuous strip A is conveyed along the straight conveying path and is prevented from distortion, by the synergistic action of the frictional resistance of the free conveying rollers 204a and the pulling action of the conveying machine 205.

The straightening machine 204 and the conveying machine 205 serve as an observation zone for facilitating the observation of the condition of extrusion as well as means for conveying the continuous strip A as extruded from the nozzle 203 to the next process.

A drying machine 206 reduces the water content of the continuous strip A from 15 to 25% to approximately 1% in a short time in the range of several minutes to several hours. The drying machine 206 employs an infrared-ray heater, a far infrared-ray heater, a microwave heater or hot air, or a combination of one or more of those heating means as the heat source 207. An infrared-ray heater and a far infrared-ray heater in particular, are effective for drying the surface and the central portion of the continuous strip A simultaneously in a short time utilizing the synergistic effect of far infrared rays radiated from quartz and fedlspar of the clay radiated by infrared rays.

A conveying mechanism 208 comprises heat-resistant conveyor rollers or a heat-resistant mesh wire belt (not shown) arranged in the drying zone of the drying machine 206 to convey the continuous strip A along the conveying path. In one drying zone for reducing the water content of the continuous strip A to approximately 6 to 8% are provided free rollers 208a, while in the other zone subsequent to the former zone are provided driving rollers 208b rotating at a rotating speed corresponding to the moving speed of the continuous strip A.

A moving cutter 209 employing rotary cutting blade means, laser beam cutting means, electric discharge cutting means or wire-cut cutting means cuts the continuous strip A into pieces having an optional length, for example, a length in the range of 300 to 4000 mm. Naturally, the moving cutter 209 cuts the continuous strip A moving at the same speed as the moving speed of the continuous strip A. The moving speed of the continuous strip A corresponds to the extrusion speed of the vacuum extruder 201, while the moving speed of the continuous strip A during drying varies with shrinkage. A delivering mechanism 210 delivers the cut pieces C having a fixed length to the next process by means of driving rollers or a conveyor belt at a speed higher than the extruding speed of the extruder 202. Indicated at 211 is a firing furnace, namely, a roller hearth kiln or a tunnel firing furnace. The interior of the firing furnace 211 is divided substantially into a preheating zone 212, a firing zone 213 and a cooling zone 214. Temperature distribution in the firing furnace is represented by an upward convex curve with respect to the direction from the entrance 211a to the exit 211b.

In the fourth embodiment, since the straightening machine is interposed between the extruder and the conveying mechanism, the continuous strip as extruded is conveyed to the drying machine along a straight conveying path without being distorted, and thereby the distortion of the product is reduced remarkably as compared with products produced by the conventional ceramic article manufacturing system.

Figure 14:
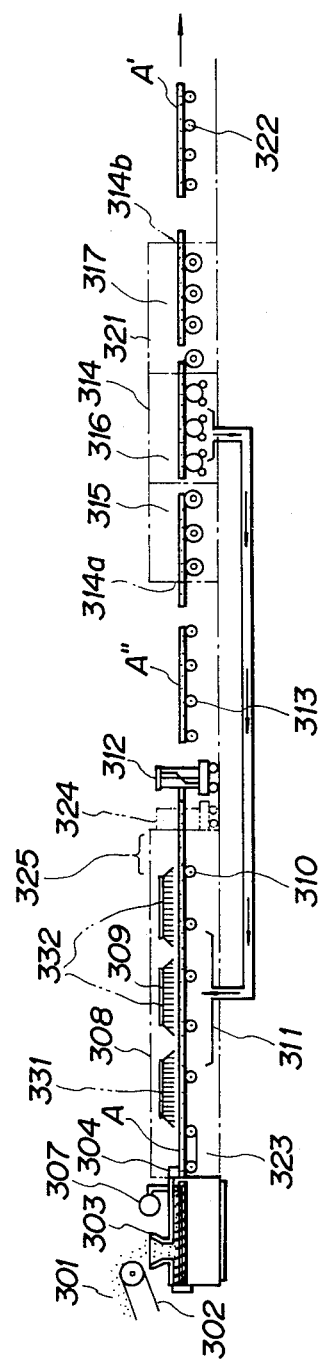
FIG. 14 is a side elevation of a continuous elongate ceramic article manufacturing system incorporating fifth, sixth, eighth and tenth embodiments according to the present invention.
Figure 15A:
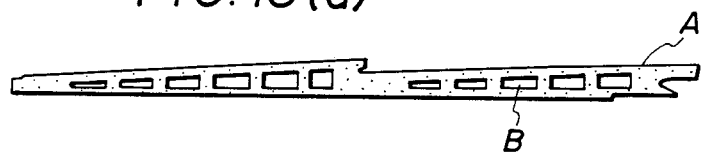
FIGS. 15(a) to 15(e) and 15(f) are sectional views similar to FIGS. 13(a) to 13(d), showing extruded strips, respectively.
Figure 15B:
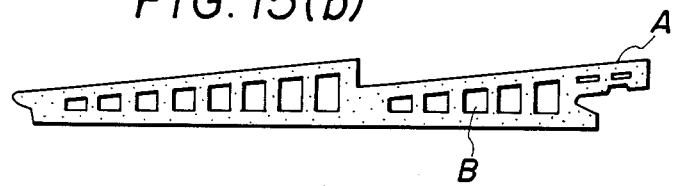
Figure 15C:
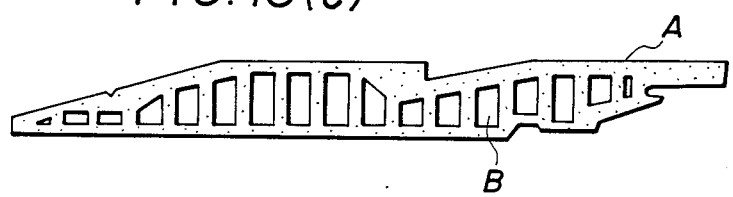
Figure 15D:
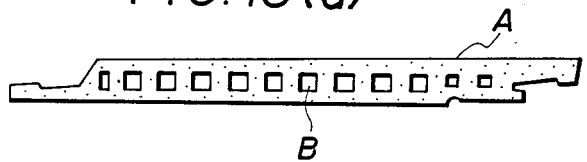
Figure 15E:
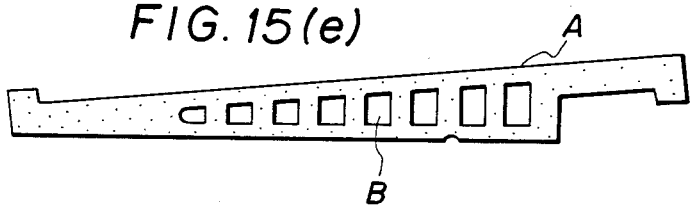
Figure 15F:
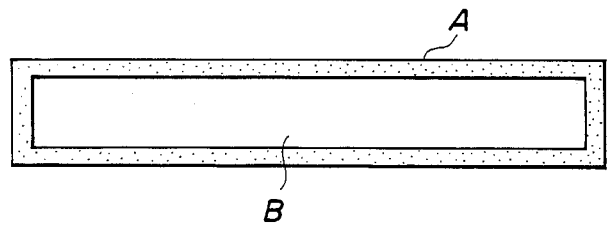

Fifth Embodiment (FIGS. 14, 15(a) to 15(f)):

Referring to FIG. 14, clay 301 is prepared by kneading several materials and, if necessary, chamotte by a kneading machine (not shown). The clay 301 is supplied by a belt conveyor 302 to an extruder 303. The extruder 303 extrudes the clay 301 through a nozzle 304 provided with a lattice core 305 (FIG. 5) in a continuous strip A having hollows B and a cross section as shown in one of FIGS. 15(a) to 15(f). The lattice 305a of the lattice core 305 are hollow rods having sections corresponding to the sections of the hollows B formed in the continuous strip A. A pipe 306 connected at one end to a pump 307 is connected at the other end to the core 305 for the forced supply of hot air, warm air of dry air into the hollows B of the continuous strip A or for the forced ventilation of the hollows B of the continuous strip A in order to reduce the continuous strip drying time effectively. A drying machine 308 comprises an infrared-ray or a microwave heat source 309 and a conveying mechanism 310. The continuous strip A is dried uniformly from the central portion to the surface thereof in a short time by the synergistic effect of the forced ventilation of the hollows B of the continuous strip A for making the water contained in the continuous strip A evaporate from the surfaces of the hollows B, and the heating effect of the heat source 309. The drying machine reduces the water content of the continuous strip A, for example, from 15 to 25% down to 0 to 5%, so that the shape retentivity of the continuous strip A is enhanced and the continuous strip A is prepared for firing. The drying machine 308 is equipped with far infrared-ray heaters or microwave heaters, alternate arrangement of far infrared-ray heaters and microwave heaters, or heaters disposed in the initial drying zone and heaters disposed in the final drying zone. The drying machine 308 heats the continuous strip A up to 800° to 500° C. according to a heating curve so that the continuous strip A will not crack. The conveying mechanism 310 comprises free rollers, driven rollers, conveyor belt (not shown), mesh wire belt (not shown), or a combination of these conveying means. Naturally, the drying machine 309 may be provided with a heating device 311 which utilizes the waste heat of a firing furnace 314 which will be described hereinafter.

A moving cutter 312 corresponding to the cutter 4a of FIG. 1, employing rotary blade cutting means, laser cutting means, hydraulic cutting means or electric discharge cutting means cuts the dried continuous strip A into elongate dry plates A" having a fixed length. A conveying mechanism 313 corresponding to the conveying machine 14a of FIG. 1 conveys the dry plates A" dut by the moving cutter 312 to the firing furnace 314.

The interior of the firing furnace 314 is divided substantially into a preheating zone 315, a firing zone 316 and a cooling zone 317. Temperature distribution in the firing furnace is represented by an upward convex curve with respect to the direction from the entrance 314a to the exit 314b. The approximate temperature ranges in the preheating zone 315, the firing zone 316 and the cooling zone 317 are 150° to 700° C., 800° to 1350° C. and 600° and 100° C., respectively. Naturally, the respective set temperatures of the preheating zone 315, the firing zone 316 and the cooling zone 317 are dependent on the type and composition of the clay 301, and these zones 315, 316 and 317 are not necessarily demarcated distinctly in respect of temperature and are substantial divisions in a continuous firing process.

Kerosene or an inflammable gas, such as LPG, is burnt in the firing furnace 314 to fire the dry plates A". Burners (not shown) are disposed in an appropriate arrangement so that the preheating zone 315, the firing zone 316 and the cooling zone 317 are substantially demarcated in the firing furnace 314. In the firing furnace 314, the dry plates A" are conveyed by a conveying device employing a mesh wire belt, metallic rollers or ceramic rollers. Particularly, since the temperature in the firing zone 316 rises up to 1350° C., high-alumina rollers 320, i.e., ceramic rollers, each is mounted on a pair of parallel metallic rollers 318 and 319 as shown in FIG. 7 to convey the dry plates A" without transmitting heat through the conveying device to the driving unit. The linear path of the dry plates A" is covered with a heat insulating cover 321. The walls of the firing zone 315 of the firing furnace 314 are formed of refractory bricks or ceramic fibers. The dry plates A" are conveyed continuously and linearly through the firing zone 315. The firing furnace 314 is provided with exhaust dampers (not shown) in an appropriate arrangement.

Conveying devices 322 and 323 each comprises a plurality of rollers, a conveyor belt, or a combination of rollers and a conveyor belt. The conveying device 322 conveys elongate ceramic plates A' produced by firing the dry plates A", at a speed higher than the delivering speed of the firing furnace 314 so that the elongate ceramic plates A' will not collide with each other. The conveying device 323 is provided only when necessary. When the conveying mechanism 310 employs free rollers, the conveying device 323 conveys the continuous strip A extruded from the nozzle 304 at a speed corresponding to or somewhat higher than the extruding speed to convey the continuous strip A under tension to the conveying mechanism 310. When the continuous strip A is dislocated from the correct conveying path by the extruder 303 and the conveying device 323, the conveying mechanism 310 employing the free rollers straightens the continuous strip A.

The manner of operation of the fifth embodiment will be described hereinafter. The clay 301 is prepared by kneading a mixture of 61.5% wt natual clay, 20% wt chamotte, 0.3% wt water reducing agent ("SEL-FLOW", Daiichi Kogyo Seiyaku K.K.) and 18% wt water by a clay kneader ("Type MP-100", Miyazaki Tekko K.K.). The extruding capacity of the extruder ("Type MV-FM-A-1", Miyazaki Tekko K.K.) is 100 to 150 l/hr. The pump 307 is driven by a 5 HP motor for sucking or exhausting air. The drying machine 308 is provided with twenty sets of far infrared-ray panel heaters of 4 to 400 $\mu$ wavelength arranged in a space of 10 m in length. The drying machine 308 reduces the water content of the continuous strip A down to 0 to 2% in about ten minutes by heating the continuous strip A by the far infrared-ray panel heaters and warm air of about 30° C. causing the surface evaporation by radiation and internal diffusion of moisture by warm air circulation through pipe 306. Then, the continuous strip A thus dried is cut by the moving cutter 312 into the dry plates A" of 3 m in length. The dry plates A" are conveyed continuously by the conveying mechanism 313 to the firing furnace 314. The firing furnace 314 is of the roller hearth kiln type. The dry plates A" are preheated, fired and cooled as they are conveyed along the roller hearth from the entrance 314a to the exit 314b of the firing furnace 314 to produce elongate ceramic plates A'.

The fifth embodiment is capable of continuously manufacturing elongate ceramic plates at a high production rate, at a high yield rate and at a low cost through the clay extruding process, the rapid drying process and the firing and cooling process sequentially arranged along a straight line. The water content of the continuous strip is reduced smoothly in a short time at a low cost without distorting and cracking the continuous strip by the synergistic effect of infrared rays, hot air (surface evaporation) heated by the waste heat of the firing furnace, and ventilation of the hollows of the continuous strip (internal diffusion). Thus, the fifth embodiment enables highly efficient mass-production of elongate ceramic plates having an optional length. The length of the drying process of the fifth embodiment is approximately 1/160 that of the conventional drying process, which reduces the floor space necessary for installing a continuous elongate ceramic article manufacturing system.

Sixth Embodiment (FIG. 14):

In the fifth embodiment, the continuous strip A is cut into the dry plate A" by the moving cutter 312 disposed one to two meters apart from the exit of the drying machine 312. However, since pressurized air containing a large amount of steam is supplied into the hollows B of the continuous strip A, the dry portion of the continuous strip A, particularly, the free end of the continuous strip A, sometimes is distorted or cracked. Accordingly, in the sixth embodiment, a moving cutter 324 is disposed contiguously to the exit of the drying machine 308 as indicated by imaginary lines in FIG. 14, to cut the continuous strip A at the exit of the drying machine 308.

The exit 325 of the drying machine 308 is extended by a length sufficient to cover the continuous strip A to a position immediately before a continuous strip cutting position. If the moving cutter 324 is disposed apart from the exit of the drying machine 308, the continuous strip A heated in the drying machine 308 is cooled while the same travels through the distance between the exit of the drying machine 308 and the moving cutter 324, and thereby the steam contained in the hollows B of the continuous strip A is caused to condense, which, sometimes, distorts or cracks the cut end of the continuous strip A. Thus, the improvements in the sixth embodiment include disposing the moving cutter 324 contiguously to the exit of the drying machine 308 and extending the exit portion 325 of the drying machine 308 close to the moving cutter 324 so that the continuous strip A will not be neither distorted not cracked.

Figure 16:
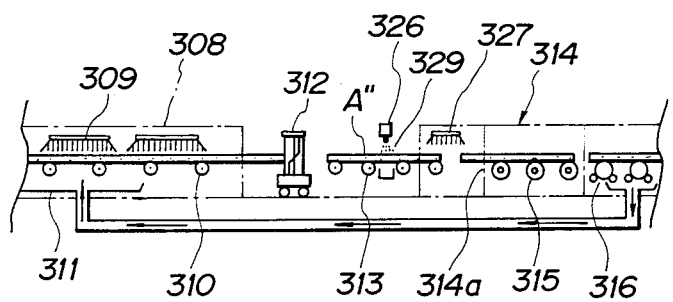
FIG. 16 is a fragmentary side elevation of a continuous elongate ceramic article manufacturing system, in a seventh embodiment, according to the present invention.

Seventh Embodiment (FIG. 16):

The seventh embodiment includes a glazing machine 326 and a drying heater 327 interposed between the moving cutter 312 and the firing furnace 314 of the fifth embodiment, as shown in FIG. 16. The parts and mechanisms of the seventh embodiment like or corresponding to those of the fifth embodiment are designated by like reference characters and the description thereof will be omitted to avoid duplication.

The glazing machine 326 corresponding to the glazing machine 13a of FIG. 1 has one or a plurality of spray coating units, curtain flow coating units, screen printing unit or roller coating units for applying a glaze 329 to the decorative surface of the dry plate A". The glaze 329 is of a known or a new composition. The color, pattern and thickness over the surface of the dry plate A" of the glaze 329 are dependent on the purpose of the ceramic plate A'. A drying heater 327 evaporates and volatilizes water of the glaze 329 to some extent at approximately 50° to 450° C. in one to five minutes. The drying heater 327 may be omitted when the firing furnace 314 has a long preheating zone 315 of low temperature.

The seventh embodiment has, in addition to the advantages of the sixth embodiment, an advantage that elongate ceramic plates having glazed surface are produced through a continuous process.

Eighth Embodiment (FIGS. 5(a), 5(b) and 14):

The eighth embodiment is a modification of the fifth embodiment. The lattice core 305 shown in FIGS. 5(a) and 5(b) combined with the nozzle 304 of the fifth embodiment has a pipe 306 for supplying or exhausting air attached to the inlet or outlet of the lattice core 305. In the eighth embodiment, as illustrated in FIGS. 5(a) and 5(b), a pipe 330 for circulating hot air through the hollows of the continuous strip A is attached to one side of the lattice core 305 or to the lattice 305a.

Furthermore, the drying machine 308 of the fifth embodiment employs infrared-ray heaters and microwave heaters as the heat source, while the drying machine 308 of the eighth embodiment employs a sequential arrangement of a microwave heater 331 and infrared-ray heaters 332.

That is, the drying machine 308 of the eighth embodiment comprizes a short-period heating unit including a microwave heater 331 and far infrared-ray heaters 332 disposed after the microwave heater 331, and a conveying mechanism 310. This arrangement of the heating unit is more effective for drying the continuous strip A uniformly from the central portion to the surface of the same in a short time by the synergistic effect of the evaporation from the inner surfaces caused by air circulation through the hollows B of the continuous strip A and the heating effect of the microwave heater 331 and the far infrared-ray heaters 332. In the drying machine 308 having the microwave heater 331 and the far infrared-ray heaters 332 arranged in such order, the water contained in the central portion of the continuous strip A is caused to diffuse toward the surface by the microwave heater 331 and some part (6 to 10%) of the water is evaporated in a short time in the initial drying stage, and then the rest of the water contained in the continuous strip A is evaporated to reduce the water content down to 0 to 5% by the synergistic effect of the slow-penetrating heat of the far infrared-ray heaters 332 and the air circulated through the hollows B of the continuous strip A by the core 305 through the lattice 305a. The interior of the drying machine 308 is substantially divided into a first drying a one and a second drying zone, and the temperature distribution in the drying zones is determined in accordance with an appropriate heating curve varying in temperature in the range of 200° to 500° C. to prevent distorting and cracking the continuous strip A.

Two or more heating units each including the microwave heater 331 and the infrared-ray heaters 332 arranged in this order may be provided to enhance the drying efficiency of the drying machine 308.

Figure 17:
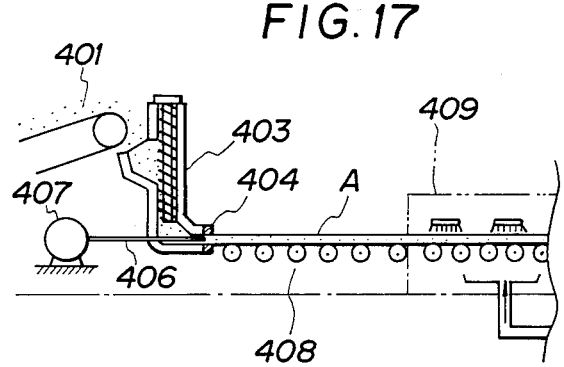
FIG. 17 is a fragmentary side elevation of a continuous elongate ceramic article manufacturing system, in a ninth embodiment, according to the present invention.
Figure 19A:
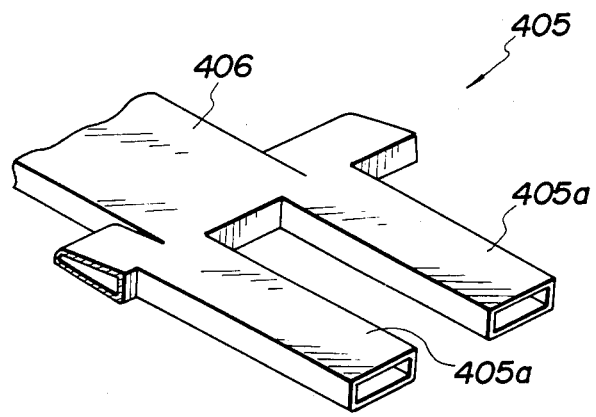
FIGS. 19(a) and 19(b) are perspective views of different cores, respectively.
Figure 19B:
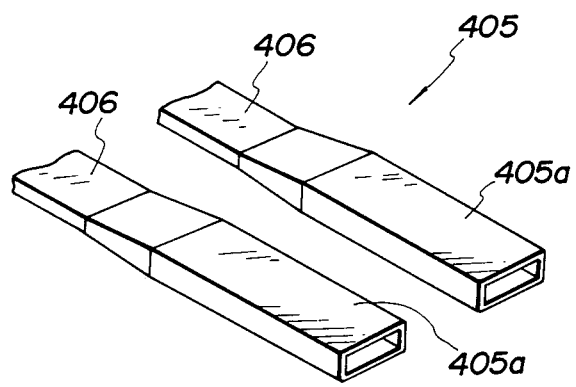

Ninth Embodiment (FIGS. 17, 19(a) and 19(b)):

The ninth embodiment is designed to dry a continuous strip A having hollows B in a greatly reduced drying time in the range of five to thirty minutes without distorting and cracking the continuous strip A through balanced surface evaporation and internal diffusion of water contained in the continuous strip by circulating air, hot air, dry air, warm air or steam through the hollows B through the lattice 405a of a lattice core 405 for forming the hollows B in the continuous strip A, combined with the nozzle of an extruder 403, to promote evaporation of water from the inner surfaces of the continuous strip A, by externally heating the continuous strip A in a drying machine 409 by hot air, far infrared rays, microwaves or a combination of these heating means for rapid drying operation, and by connecting a pipe 406 having one end connected to a pump 407 to the core 405 in parallel to the direction of movement of the continuous strip A extruded by the extruder 403 to circulate air, hot air, dry air, warm air or steam efficiently through the hollows B of the continuous strip A.

Figure 18:
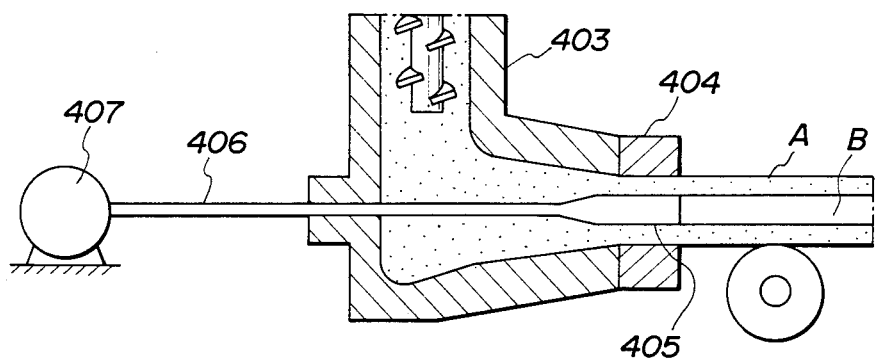
FIG. 18 is an enlarged sectional view of the extruder employed in the system of FIG. 17.

As illustrated in FIG. 18, the nozzle 404 of the extruder 403 is substantially of an L-shape. The nozzle 404 is such a nozzle that withstands a force that works thereon in extruding clay 401. The lattice core 405 is incorporated into the nozzle 404. As illustrated in FIGS. 19(a) and 19(b), the lattice core 405 has a plurality of lattices 405a having a tubular shape. Air, hot air, cool air, dry air or steam is supplied into or is exhausted from the hollows B of the continuous strip A for forced ventilation of the hollows B. The lattice core 405 is connected to the pump 407 by the pipe 406. The pipe 406 and the lattice core 405 are connected linearly, and the lattice core 405 is mounted on the extruder 403 with the pipe 406 in parallel to the direction of movement of the continuous strip A, so that undue resistance against the flow of the clay 401 is eliminated, extrusion of the continuous strip A in an irregular density distribution is obviated and air can be circulated efficiently through the hollows B of the continuous strip A and thereby evaporation of water through the hollows B and the internal diffusion of water are promoted and rapid drying is achieved.

A positive conveying machine 408 comprises rollers, belts, mesh wire belts or a combination of these conveying means. The conveying machine 408 is operated positively at a conveying speed corresponding to or slightly higher than the moving speed of the continuous strip A extruded by the extruder 403. The conveying machine 408 extends partly (FIG. 17) or entirely in a drying machine 409.

Tenth Embodiment (FIGS. 20 and 21):

The tenth embodiment incorporates further improvements in the drying machine 308 of the eighth embodiment comprising a sequential arrangement of the microwave heater 331 and the far infrared-ray heater 332.

A drying machine employing microwave heaters and far infrared-ray heaters, such as the drying machine 308 shown in FIG. 14, has problems. That is, the microwave heater is unable to heat the continuous strip A up to a temperature on the order of 130° C., rapid heating causes the continuous strip A to blow, the microwave heater is more expensive than the far infrared-ray heater, and the operating cost of the microwave heater is higher than the far infrared-ray heater. On the other hand, although the far infrared-ray heater needs more time than the microwave heater in raising the temperature of the interior of the continuous strip A, the far infrared-ray heater is far more advantageous in respect of cost effective than the microwave heater in raising the temperature of the interior of the continuous strip A. Furthermore, such a drying machine has several matters to be improved in preventing the frosting of a large amount of steam produced in drying the continuous strip A, and in drying and conveying the continuous strip A, such as the distortion of the continuous strip A by the frictional resistance of the conveyor belt against the movement of the continuous strip A, and irregular heating of the continuous strip A by the microwave heater.

In the tenth embodiment, a microwave heating machine 503 capable of dielectric heating is disposed next to a vacuum extruder 501, and a far infrared-ray heating machine 513 for raising the temperature of the continuous strip A is disposed after the microwave heating machine 503. The microwave heating machine 503 incorporates several improvements.

Figure 20:
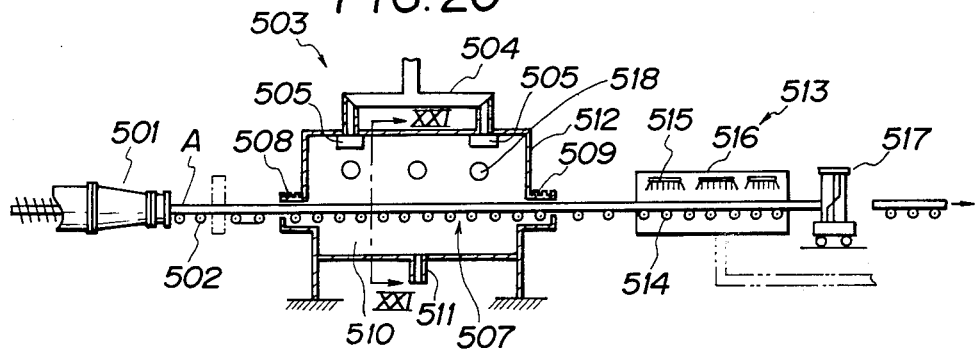
FIG. 20 is a fragmentary side elevation of a continuous elongate ceramic article manufacturing system incorporating tenth and eleventh embodiments of the present invention.
Figure 21:
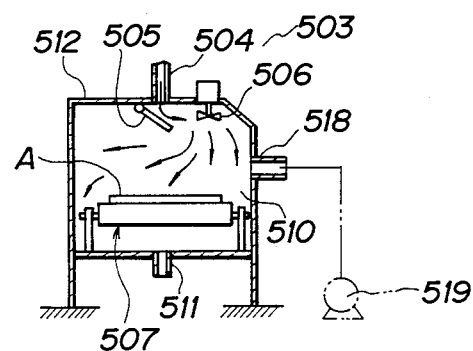
FIG. 21 is a schematic sectional view taken on the line XXI—XXI in FIG. 20.

Referring to FIGS. 20 and 21, the microwave heating machine 503 of a continuous oven system heats the interior of the continuous strip A within several seconds to several minutes by dielectric heating effect to evaporate the water contained in the continuous strip A. The microwave heating machine 503 reduces the water content by 5 to 10% among 15 to 25% water content of the continuous strip A. The continuous strip A of this kind diminishes in volume until the water content is reduced to 5 to 8% and stops diminishing in volume thereafter. The microwave heating machine 503 comprises: a waveguide 504 which propagates microwaves transmitted by a microwave oscillator (not shown) to desired zones in the microwave heating machine 503; reflectors 505 for reflecting the microwaves; fans 506 for stirring the reflected microwaves; a conveying mechanism 507 comprising accepting rollers such as free rollers or a driven conveyor belt, preferably, free rollers capable of reflecting microwaves on the backside of the continuorus strip A, for conveying the continuous strip A at a conveying speed corresponding to the extruding speed; an entrance 508; an exit 509; an enclosure 512 enclosing the heating chamber 510 so that microwaves will not leak outside; and a conduit 511 opening into the heating chamber 510 to supply air into the heating chamber 510. The entrance 508 and the exit 509 have a construction and size which will not allow microwaves to leak from the heating chamber 510. Although dependent on the purpose, the length of the heating chamber 510 is in the range of 1 to 5 m. Preferably, the conveying mechanism 507 employs free conveyor rollers to allow the continuous strip A to shrink by about 10%.

The microwave heating machine is employed to dry the continuous strip A uniformly, efficiently and rapidly. Since the continuous strip A is plastic, the continuous strip A is liable to be distorted or broken while the same is being conveyed. Accordingly, the microwave heating machine must be constituted so as to heat the continuous strip A without cracking or breaking the continuous strip A and without generating sparks. In the heating chamber, the continuous strip A may be irradiated directly by microwaves radiated from the waveguide instead of the microwaves reflected by the reflectors. Furthermore, the microwave heating machine is designed so as to suppress the thermal expansion of the continuous strip A resulting from the heat generated within the continuous strip A by the heating effect of microwaves and to prevent the adverse overheat and distortion of the continuous strip A by supplying and circulating air along both the external surface (exposed surface) and the internal surfaces defining the hollows of the continuous strip A to remove steam from the continuous strip A and to discharge a large amount of steam from the heating chamber.

The far infrared-ray heating machine 513 heats the continuous strip A up to 130° C. or above to reduce the water content of the continuous strip A down to 5 to 0%. The far infrared-ray heating machine 513 comprises: a conveying mechanism 514 employing free rollers or a conveyor belt; far infrared-ray heaters 515; and a heat insulating enclosure 516. The length of the heating zone of the far infrared-ray heating machine 513 is in the range of 2 to 10 m. Naturally, the length of the heating zone is dependent on the thickness, width and length of the half-dried continuous strip A and the conveying speed.

In operation, the clay is prepared by kneading a mixture of 61.5% wt natural clay, 18% wt chamotte, 0.3% wt water reducing agent ("SELFLOW", Daiichi Kogyo Seiyaku K.K.), and 20% wt water by a clay kneading machine ("Type MP-100", Miyazaki Tekko K.K.). The extrusion capacity of the extruder 501 ("Type VM-FM-A-1", Miyazaki Tekko K.K.) is 100 to 150 l/hr. The conveying machine 502 has free rollers and a driven conveyor belt arranged in that order. The microwave heating machine 503 has a capacity of 5 KW output and uses 2450 MHz microwaves. The length of the heating chamber of the microwave heating machine 503 is 3 m. When necessary, air is supplied at a high rate through the conduit 511 attached to the enclosure into the heating chamber 510 to prevent the steam generated by heating the continuous strip A from condensing over the inner surface of the enclosure 512 and over the surface of the continuous strip A by discharging the steam through the entrance 508 and the exit 509 to reduce the partial pressure of the steam in the heating chamber 510. The conveying mechanism 507 employs free rollers formed of fluororesin (Teflon ®). The far infrared-ray heating machine 513 comprises a plurality of far infrared-ray heaters arranged in the heating zone having a length in the range of 3 to 10 m. The capacity of the far infrared-ray heating machine 513 is, for example, 20 KW. The microwave heating machine 503 reduces the water content of the continuous strip A from 18% to 12%, and then the far infrared-ray heating machine 513 reduces the water content substantially to 0%. The extruding speed of the extruder 501 is in the range of 100 to 2000 mm/min. In an experimental operation, the extruding speed was 400 mm/min. The continuous strip A is moved along a horizontal path, and is fed to the microwave heating machine 503 by the driven conveyor belt operating at a conveying speed corresponding to the extruding speed. The free rollers of the conveying mechanism 507 of the microwave heating machine 503 allow the volumetric shrinkage of the continuous strip A attributable to the reduction of the water content. The clay supplied to the extruder 501 is extruded in the continuous strip A having a predetermined cross-sectional shape. The continuous strip A is supplied by a conveying device 502 into the microwave heating machine 503. While the continuous strip A is conveyed through the microwave heating machine 503, the water content thereof is reduced to 12% in five minutes. Then, the continuous strip A is conveyed to the far infrared-ray heating machine 513, where the water content of the continuous strip A is reduced to 1% or less in approximately ten minutes. Thus, the continuous strip A is dried in about 15 to 20 min after the same has been extruded by the extruder 501. Then, the dried continuous strip A is cut by a moving cutter 517 into pieces having a predetermined length, and then the pieces are supplied to a glazing process (not shown) or a firing process (not shown).

It is to be understood that the above-described arrangement is merely illustrative of the principles of the present invention and various other arrangements may be devised by those skilled in the art without departing from the scope of the present invention. For example, the moving cutter may be disposed at a position indicated by alternate long and short dash lines in FIG. 20, and hot air or warm air may be circulated through the microwave heating machine 503 and the far infrared-ray heating machine 513 by air supply means (only air supply means for the far infrared-ray heating machine 513 is indicated by imaginary lines in FIG. 20) to further reduce the drying time.

The tenth embodiment of the present invention is capable of drying extruded pieces of clay and an extruded continuous strip of clay having a water content of 15 to 25% by two heating processes in a drying time 1/100 to 1/300 the drying time of the conventional system without cracking, blowing, twisting and warping the extruded pieces and the extruded continuous strip. Although the extruded pieces and the extruded continuous strip shrink in volume by about 10% during the drying process, the conveying mechanism allows the free shrinkage of the extruded pieces and the continuous strip.

Eleventh Embodiment (FIGS. 20 and 21):

The eleventh embodiment is an improvement of the tenth embodiment. In the eleventh embodiment, air is supplied at a high rate into the heating chamber 510 cf the microwave heating machine 503 to discharge a large amount of steam generated by heating the continuous strip from the heating chamber 510 to prevent the steam from condensing over the inner surface of the heating chamber 510 and over the surface of the continuous strip A so that the continuous strip A can be dried in one to ten hours without being cracked, warped, twisted and blown as the continuous strip A is advanced continuously through the heating chamber 510. Thus, the microwave heating machine 503 of the eleventh embodiment can be formed in a compact construction.

In the eleventh embodiment, a conduit 518 opening into the heating chamber 510 is connected to an air circulating device 519, such as an air compressor or a ring blower.

When air is supplied at a high rate into the heating chamber 510 by the air circulating device 519, the air is circulated through and is discharged together with steam prevailing in the heating chamber 510 from the heating chamber 510 through the entrance 508 and the exit 509. Accordingly, the partial pressure of steam in the heating chamber 510 is reduced and thereby further efficient prevention of the condensation of steam over the inner surface of the enclosure 512 is achieved.

Figure 22:
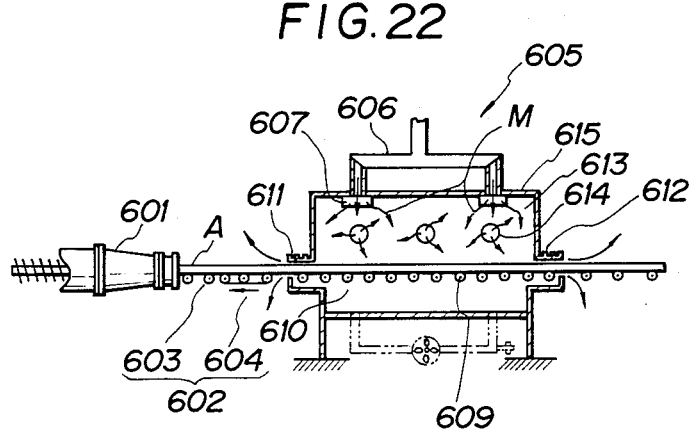
FIG. 22 is a fragmentary view of a continuous elongate ceramic article manufacturing system, in a twelfth embodiment, according to the present invention

Twelfth Embodiment (FIG. 22):

Referring to FIG. 22, an extruder 601 extrudes clay in a continuous strip A having a cross-sectional shape as shown in FIG. 13(a), 13(b), 13(c) or 13(d). Although dependent on the thickness and width of the continuous strip A, the extruding speed of the extruder 601 is, for example, in the range of 100 to 2000 mm/min.

A conveying machine 602 comprises free conveyor rollers 603 and a driven conveyor belt 604 arranged in that order, and conveys the soft continuous strip A continuously to the next process at a conveying speed corresponding to the extruding speed along a path extending on the level of the nozzle of the extruder 601 without distorting the soft continuous strip A. The free conveyor rollers 603 convey the continuous strip A as extruded without applying any frictional resistance thereto. The driven conveyor belt 604 conveys the continuous strip A positively to the next process at a conveying speed substantially the same as the extruding speed so that the continuous strip A somewhat hardened as the same is conveyed through a distance of half a meter to two meters from the nozzle of the extruder 601 will not be compressed by the cooperative effect of the force of extrusion and the weight of the preceding portion of the continuous strip A. A microwave heating machine 605 is of a continuous oven type substantially the same as that of the tenth embodiment.

The microwave heating machine 605 comprises: a waveguide 606 which propagates microwaves M transmitted by a microwave oscillator (not shown) to desired zones in the microwave heating machine 605; reflectors 607 for reflecting the microwaves M; fans 608 for stirring the reflected microwaves; conveying mechanism 610 comprising free rollers 609, for conveying the continuous strip A at a conveying speed corresponding to the extruding speed; a filtering entrance 611; a filtering exit 612; an air supply openings 614 for blowing air into a heating chamber 613; and an enclosure 615 enclosing the heating chamber 613 to prevent microwaves M from leaking from the heating chamber 613.

The twelfth embodiment is featured by the conveying machine 602 comprising the free rollers 603 and the driven conveyor belt 604, which conveys the continuous strip A positively at a conveying speed substantially the same as the extruding speed along a path on the same level as a path line extending between the extruder 601 and the microwave heating machine 605, disposed between the extruder 601 and the microwave heating machine 605 which reduces the water content of the continuous strip A in a short time, the free rollers of the conveying mechanism of the microwave heating machine 605, and the air supply openings 614 for supplying air into the heating chamber 613.

In the twelfth embodiment, the soft continuous strip A having a water content of 15 to 25% is supplied continuously and smoothly without being distorted to the microwave heating machine (primary drying machine), the microwave heating machine 605 absorbs the volumetric shrinkage of the continuous strip A, and the microwave heating machine 605 dries the continuous strip A in a reduced time 1/100 to 1/300 the drying time of the conventional drying machine. Since the conveying path extends linearly from the extruder 601 through the microwave heating machine 605, the continuous strip can smoothly be dried to a desired extent.

Thirteenth Embodiment (FIGS. 23 to 25):

The thirteenth embodiment comprises: an extruder 701; a conveying machine 709 for smoothly conveying a continuous hollow strip A to the next process; a microwave heating machine 712 which evaporates about one-third of the water contained in the continuous hollow strip A in a short time in the range of one to thirty minutes; and a far infrared-ray heating machine 726 which reduces the water content of the continuous hollow strip A to 1% or below in a short time in the range of one to thirty minutes, arranged in that order. Air or dry air is blown into the hollows of the continuous hollow strip A through an opening formed in the core of the nozzle of the extruder 701 to remove the steam stagnating within the hollows while the continuous hollow strip A is being heated so that portions of the continuous hollow strip A surrounding the hollows are heated efficiently, and to prevent the condensation of steam within the hollows so that the continuous hollow strip A is dried uniformly. Air, dry air or hot air is blown into the heating chamber 719 to discharge steam stagnating within the heating chamber 719 and over the surface of the continuous hollow strip A from the heating chamber 719 to prevent the condensation of steam over the inner surface of the heating chamber 719 and over the surface of the continuous hollow strip A so that the continuous hollow strip is dried efficiently in a drying time 1/10 to 1/300 that of the conventional drying machine without distorting, blowing, cracking, warping and twisting the continuous hollow strip A. Thus, the continuous elongate ceramic article manufacturing system, in the twelfth embodiment, according to the present invention is formed in a compact construction, and is capable of continuously manufacturing elongate ceramic articles.

In FIG. 23, indicated at 702 is a nozzle internally provided with a core (not shown) connected by a hose 708 to a pump 707 for supplying air to the core. Also shown in FIG. 23 are a conveying machine 709, free rollers 710, a driven conveyor belt 711, a conveying mechanism 716, an entrance 717, an exit 718, a heating chamber 719, air supply opening 720, an enclosure 721, a conveying mechanism 727, far infrared-ray heaters 728, a heat insulating box 729, and a moving cutter 730.

A waveguide 713 propagates microwaves M transmitted by a microwave oscillator (not shown). A reflector 714 is for reflecting the microwaves M. A way of introduction of the microwaves M into the enclosure 721 will be described in detail in a next fourteenth embodiment. The air supply opening 720 is connected to the pump 707 by another hose 748.

The conveying mechanism 716 is designed so that the upper surface, side surfaces and lower surface of the continuous hollow strip A are exposed uniformly to the microwaves and air supplied into the heating chamber 719 and so that the continuous hollow strip A is allowed to shrink in volume by about 10% when heated. As illustrated in FIGS. 24(a) and 24(b), the conveying mechanism 716 comprises, for example, free rollers 723 each formed of fluororesin (Teflon ®), fixed shafts 722 rotatably supporting the free rollers 723, respectively, frame members 724 fixedly supporting the fixed shafts 722, and, when necessary, shielding plates 725. The free roller 723 shown in FIG. 24(a) is divided longitudinally into three separate sections to reduce the resistance of the free roller 722 against the movement of the continuous hollow strip A. The free roller 723' shown in FIG. 24(b) is formed in a single member. As illustrated in FIG. 25, slots 724a are formed in each frame member 724 to expose the backside of the continuous hollow strip A to microwaves. The shielding plates 725 are effective to prevent the physically possible excessive exposure of the respective upper portions of the side surfaces of the continuous hollow strip A to microwaves for uniform heating of the continuous hollow strip A.

Fourteenth Embodiment (FIGS. 26 and 27):

The fourteenth embodiment incorporates an improved microwave heating machine.

Figure 26:
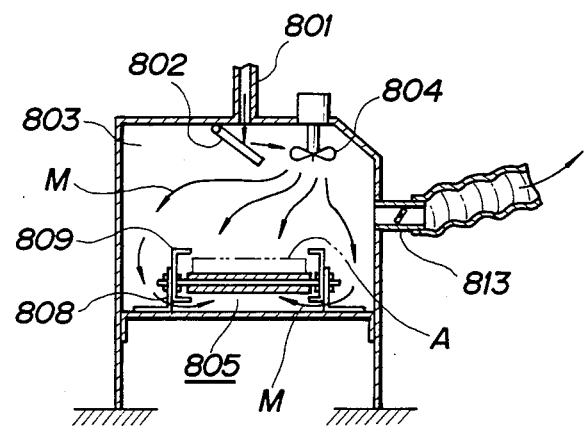
FIG. 26 is a schematic sectional view of a microwave-heating machine incorporated in the fourteenth embodiment of the present invention.
Figure 27:
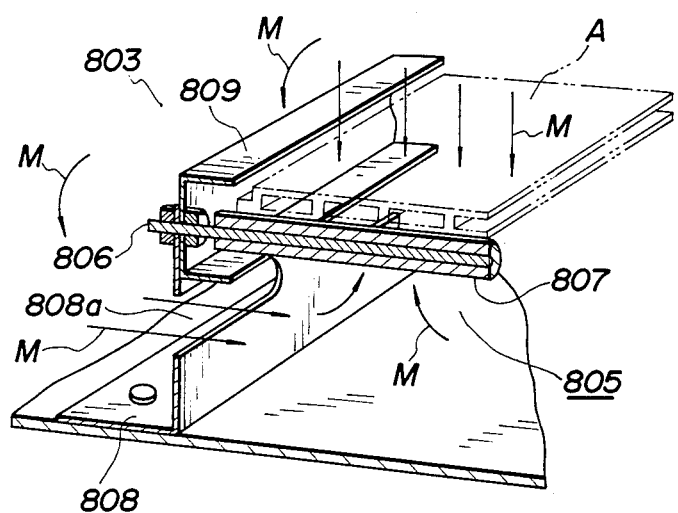
FIG. 27 is a partly cutaway sectional perspective view of the roller conveyor unit of the microwave-heating machine of FIG. 26.

Referring to FIGS. 26 and 27, the improved microwave heating machine comprises: a waveguide 801 which propagates microwaves transmitted by a microwave oscillator (not shown) to desired zones in the microwave heating machine; reflectors 802 which dispersively reflects the microwaves in a heating chamber 803; fans 804 which stirs the reflected microwaves M to distribute the microwaves M uniformly within the heating chamber 803; and a roller conveyor 805 designed so as to expose the continuous strip A uniformly to the microwaves M and air supplied into the heating chamber 803 and to allow the volumetric shrinkage on the order of 10% of the continuous strip A while the same is being dried and to convey the continuous strip A without distorting the same.

The constitution of the roller conveyor 805 is substantially the same as that shown in FIGS. 24(a), 24(b) and 25. That is, the roller conveyor 805 comprises: free rollers 807 formed of fluororesin (Teflon ®); fixed shafts 806 rotatably supporting the free rollers 807, respectively; supporting frames 808 fixedly supporting the fixed shafts 806; and shielding plates 809. Slots 808a are formed in each supporting frame 808 to expose the backside of the continuous strip A to microwaves. The shielding plates 809 are effective to prevent the excessive exposure of the respective upper portions of the side surfaces of the continuous strip A to microwaves for uniform heating of the continuous strip A. Pipes 813 for supplying or exhausting air therethrough are attached to the wall of the heating chamber 803. The pipes 813 are connected to an air circulating device capable of blowing or sucking air, dry air or warm air, such as an air compressor or a ring blower (not shown).

As is apparent from the foregoing description, in the fourteenth embodiment, the free rollers 807 capable of allowing the free volumetric shrinkage of the continuous strip are employed for conveying the continuous strip, the opposite ends of the free rollers 807 are covered with the shielding plates 809 having a U-shaped cross sectron to prevent the excessive exposure of the side surfaces of the continuous strip to microwaves, respectively, the backside of the continuous strip is irradiated by microwaves M from behind the free rollers 807 for uniform heating, and air is supplied into the heating chamber 803 to expel steam from the heating chamber 803 through the entrance and exit of the same so that steam will not condense within the heating chamber 803. Thus, the fourteenth embodiment reduces the water content of the continuous strip rapidly without cracking, warping, twisting and blowing the continuous strip. Fifteenth Embodiment (FIGS. 28 to 32):

The fifteenth embodiment extrudes clay in a continuous tube A, cuts and spreads the continuous tube A in a continuous flat plate A1, dries the continuous flat plate A1 in a drying machine, cuts the continuous flat plate A1 by a moving cutter into plates, and then fires the plates by a firing furnace to produce ceramic plates. The fifteenth embodiment comprises: an extruder which extrudes material, such as clay or pottery clay, in a continuous tube; a spreading machine 904 which cuts the continuous tube along the genetrix thereof and opens the same in a continuous flat plate; a rolling mill 906 which rolls the continuous flat plate in a continuous flat plate having a predetermined thickness and a predetermined width; a trimming machine 908 which trims the continuous flat plate delivered from the rolling mill in a predetermined width; a microwave heating machine of a continuous oven type which reduces the water content of the trimmed continuous flat plate by a large decrement; a far infrared-ray heating machine which raises the temperature of the continuous flat plate half-dried by the microwave heating machine to reduce the water content to about 5 to 0%; a moving cutter which cuts the dried continuous flat plate into flat plates having a predetermined length; and a firing furnace of a roller hearth kiln type which fires the flat plates.

The extruder, the microwave heating machine, the far infrared-ray heating machine, the moving cutter and the firing furnace are substantially the same in function and construction as those of the foregoing embodiments, and hence the description thereof will be omitted to avoid duplication, and only the spreading machine 904 corresponding to the spreading machine 8 of FIG.

8, the rolling mill 906 corresponding to the rolling machine 9 of FIG. 1, and the trimming machine 908 corresponding to the edge cutting machine 10 of FIG. 1 will be described with reference to FIGS. 28 to 31.

Figure 28:
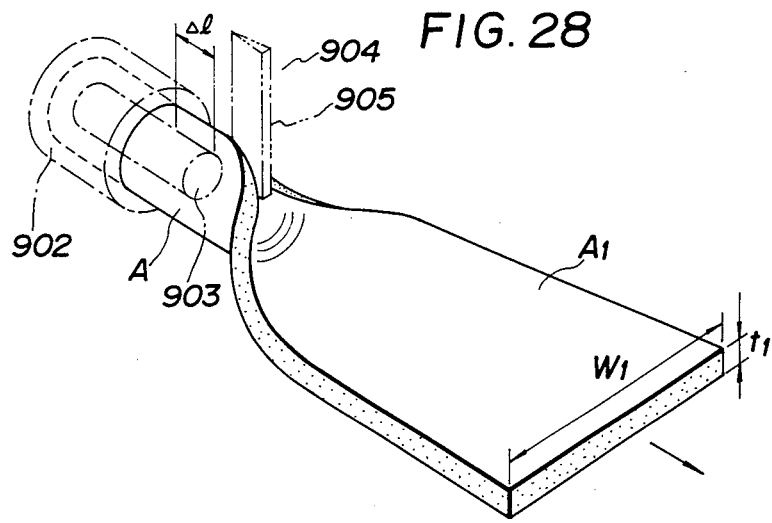
FIG. 28 is a perspective view showing a portion of a spreading machine incorporated into a fifteenth embodiment of the present invention.
Figure 29:
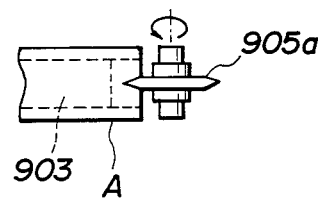
FIG. 29 is a plan view of another spreading machine.
Figure 30A:
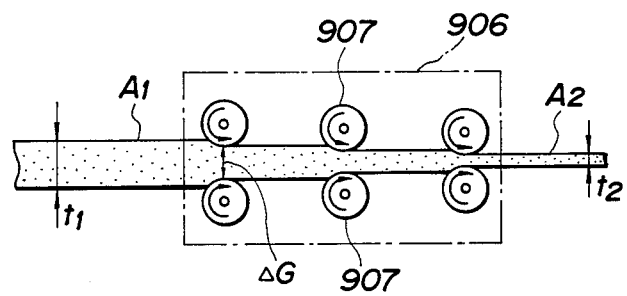
FIGS. 30(a) and 30(b) are views of assistance in explaining a rolling process.
Figure 30B:
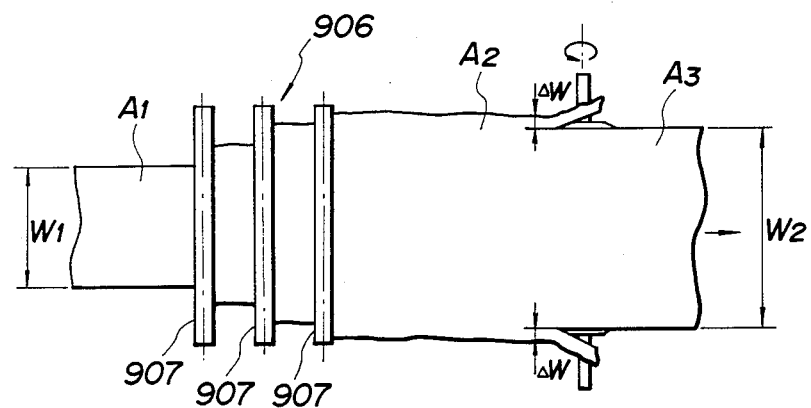
Figure 31:
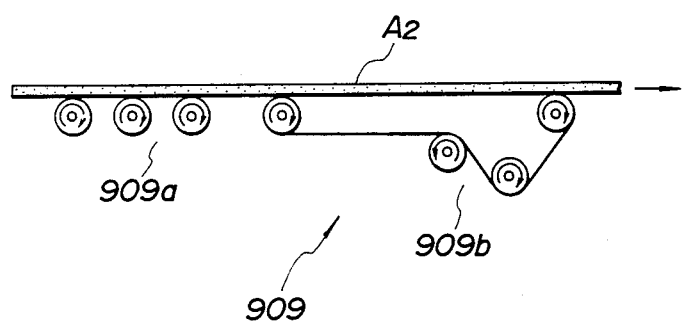
FIG. 31 is a schematic side elevation of a conveying machine.

As illustrated in FIG. 28, the extruder has a cylindrical nozzle 902 and a cylindrical lattice core 903 disposed coaxially with the cylindrical nozzle 902. The clay is extruded through the annular gap between the cylindrical nozzle 902 and the cylindrical lattice core 903 in a continuous tube A. The core 903 projects from the nozzle 902 by a length $\Delta l$ to guide the continuous tube A. The spreading machine 904 cuts the continuous tube A along the generatrix thereof with a cutting blade 905 or a cutting disk 905a (FIG. 29) disposed at a small distance from the free end of the core 903 to spread the continuous tube A in a continuous flat plate A1. The rolling mill 906 rolls the continuous flat plate A1 having a thickness $t_1$ and a width $W_1$ into a thin and wide continuous flat plate A2 having a predetermined thickness $t_2$ and a predetermined width $W_2$ through a plurality of rollers, for example, three to five rollers. The roll gap $\Delta G$ between the plural rollers 907 is reduced in steps to reduce the thickness of the continuous flat plate A1 gradually as illustrated in FIGS. 30(a) and 30(b). The trimming machine 908 trims the continuous flat plate A2 to remove the irregular side edges of the continuous flat plate A2 to form a regular continuous flat plate A3. A conveying machine 909 having free rollers 909a, a driven conveyor belt 909b which is driven at a conveying speed corresponding to the delivering speed of the rolling mill 906, or a combination of the free rollers 909a and the driven conveyor belt 909b as illustrated in FIG. 31. The conveying machine 909 conveys the continuous flat plate A3 without distorting the same to the next process.

The fifteenth embodiment has the following features:

(1) A thin continuous flat plate can be formed in a short time by extruding a continuous tube having a uniform wall thickness, cutting and spreading the continuous tube in a continuous flat plate, and then rolling the continuous flat plate in a thin and wide continuous flat plate.

(2) Dry flat plates having an optional length can easily be produced by cutting the thin and wide continuous flat plate.

(3) Extrusion, drying and firing are carried out through an integrated process and the drying time is 1/10 to 1/300 that of the conventional system.

(4) The thin and wide continuous flat plate can rapidly dried without being cracked, warped and twisted.

(5) The firing conditions are optional.

(6) Rapid drying reduces the length of the drying process to about 1/10 to 1/300 that of the conventional system, and thereby floor space necessary for installing the system is reduced remarkably and the throughput of the system is increased.

What is claimed is:

1. A continuous elongate ceramic article manufacturing system comprising a sequential linear arrangement of:

an extruder having a nozzle which continuously extrudes a material clay containing clays as principal components;

a drying machine for drying a continuous strip extruded by the extruder;

a moving cutter for cutting the continuous strip delivered from the drying machine into dry elongate plates having a predetermined length;

a conveying machine for conveying the dry elongate plates;

a firing furnace which continuously preheats, fires and cools the dry elongate plates; and a delivering machine which delivers the fired elongate plates delivered from the firing furnace to the next process, characterized in that the nozzle of the extruder is provided with a hollow lattice core for forming hollows within the continuous strip, and one or a plurality of pipes corresponding to the number of legs of the lattice of the lattice core are attached to the front or rear part of the lattice core to circulate gaseous fluid through the hollows of the continuous strip in the direction of movement of the extruded continuous strip.

2. A continuous elongate ceramic article manufacturing system as recited in claim 1, wherein a straightening machine comprising free conveyor rollers for guiding the continuous strip straight to the next process, and a conveying machine which pulls the continuous strip delivered from the straightening machine at a conveying speed slightly higher than the extruding speed of the extruder to convey the continuous strip under tension to the next process are disposed between the extruder and the drying machine; said drying machine comprises free conveyor rollers arranged in a drying zone where the water content of the continuous strip is reduced to about 10 to 6%, and driven rollers driven at a conveying speed corresponding to the moving speed of the continuous strip and arranged in a drying zone subsequent to the first-named drying zone.

3. A continuous elongate ceramic article manufacturing system as recited in claim 1, wherein said moving cutter is practically contiguous to the exit of said drying machine, and cuts the continuous strip delivered from the drying machine into dry elongate plates having a predetermined length.

4. A continuous elongate ceramic article manufacturing system as recited in claim 1, wherein a glazing machine for glazing the dry elongate plates dried by said drying machine and cut by said moving cutter is disposed between said moving cutter and said firing furnace.

5. A continuous elongate ceramic article manufacturing system as recited in claim 1, wherein said drying machine comprises a microwave heating unit and a far infrared-ray heating unit arranged in the direction of gaseous fluid flow.

6. A continuous elongate ceramic article manufacturing system as recited in claim 1, wherein said pipe or pipes are attached to said lattice core.

7. A continuous elongate ceramic article manufacturing system as recited in claim 5, wherein said microwave heating unit is of a continuous oven type which reduces the water content of the continuous strip extruded by said extruder in a short time, and said far infrared-ray heating unit functions mainly for raising the temperature of the continuous strip after the same has been heated by the microwave heating unit.

8. A continuous elongate ceramic article manufacturing system as recited in claim 5, wherein said drying machine comprises a plurality of heating sections each comprising a microwave heating unit and a far infrared-ray heating unit arranged in that order.

9. A continuous elongate ceramic article manufacturing system as recited in claim 5, wherein said drying machine has an enclosure forming a heating chamber and provided with air supply openings, through which air is supplied into the heating chamber to discharge a large amount of steam produced by heating the continuous strip from the heating chamber.

10. A continuous elongate ceramic article manufacturing system as recited in claim 7, wherein a conveying machine comprising free conveyor rollers and driven conveyor belt which is driven at a conveying speed substantially the same as the extruding speed of the extruder is disposed between said extruder and said microwave heating unit of a continuous oven type for reducing the water content of the continuous strip in a short time so as to form a conveying path in line with the path extending between said extruder and said microwave heating unit; said microwave heating unit is provided with a conveying mechanism of a free conveyor roller system; and said microwave heating unit has air supply openings opening into the microwave heating zone.

11. A continuous elongate ceramic article manufacturing system as recited in claim 1, wherein said firing furnace is of the roller hearth kiln type.

12. A continuous elongate ceramic article manufacturing system as recited in claim 5, wherein said microwave heating unit has a roller conveyor comprising free rollers of a construction which will not cause sparking and overheating for guiding and conveying the continuous strip to be heated by the microwave heating unit; said rollers having shafts, members having vertical walls for supporting said shafts, a plurality of through holes for passing microwaves therethrough are formed in the vertical walls of said members for supporting the shafts of the free conveyor rollers; and microwave shielding plates haing a U-shaped cross section are provided along the opposite sides of the roller conveyor so as to cover the upper and lower surfaces of the side edges of the continuous strip.

13. A continuous elongate ceramic article manufacturing system comprising a linear arrangement of:
 a vacuum extruder which continuously extrudes a clay material containing clays as the principal materials, in a continuous strip;
 a heating machine which dries the continuous strip by infrared rays;
 a drying machine which dries the continuous strip delivered from the heating machine;
 a firing furnace which fires the continuous strip delivered from the drying machine;
 a moving cutter which cuts the fired continuous strip delivered from the firing furnace into elongated ceramic plates having a predetermined length; and
 a delivering machine which delivers the elongate ceramic plates formed by cutting the fired continuous strip by the moving cuter;
 characterized in that the nozzle of the extruder is provided with a tubular lattice core for forming a hollow in the longitudinal central portion of the continuous strip and a ventilating pipe connected to external equipment at one end is connected at the other end to the tubular lattice of the tubular lattice core at a position near the inlet thereof for forcing gaseous fluid through the hollow in the continuous strip in the direction of movement of the extruded continuous strip.

14. A continuous elongated ceramic article manufacturing system as recited in claim 13, wherein a perforating machine for forming ventilating holes only on the continuous strip immediately after the same has been extruded by the extruder is disposed between the extruder and the heating machine; and a glazing machine is disposed between the drying machine and the firing furnace.

15. A continuous elongate ceramic article manufacturing system as recited in claim 14, wherein said perforating machine comprises a perforating roller formed by setting spikes on the circumference of a roller at suitable circumferential and axial intervals, and rotatably suppported near the nozzle of the extruder.

16. A continuous elongate ceramic article manufacturing system as recited in claim 14, wherein said perforating machine comprises a toothed perforating plate disposed in front of the nozzle of the extruder and is driven by a driving source for vertical and horizontal reciprocatory motions.

* * * * *

UNITED STATES PATENT AND TRADEMARK OFFICE
CERTIFICATE OF CORRECTION

PATENT NO. : 4,764,102

DATED : August 16, 1988

INVENTOR(S) : R. Takahashi

It is certified that error appears in the above-identified patent and that said Letters Patent is hereby corrected as shown below:

IN THE ABSTRACT:

At line 6, change "drying strip" to -- drying the continuous strip --.

IN THE SPECIFICATION:

At column 10, line 53, change "600° and 100°" to -- 600° to 100° --.

At column 15, line 22, change "continuorus" to -- continuous --.

At column 20, lines 36-37 should read
-- uous strip.
        Fifteenth Embodiment (FIGS. 28 to 32): --.

IN THE CLAIMS:

At column 23, line 34, change "haing" to -- having --.

At column 24, line 12, change "cuter" to -- cutter --.

At column 24, line 23, change "elongated" to -- elongate --.

At column 24, line 35, change "supp-" to -- sup- --.

UNITED STATES PATENT AND TRADEMARK OFFICE
CERTIFICATE OF CORRECTION

PATENT NO. : 4,764,102

DATED : August 16, 1988

INVENTOR(S) : R. Takahashi

It is certified that error appears in the above-identified patent and that said Letters Patent is hereby corrected as shown below:

IN THE CLAIMS:

At column 24, line 16, change "strip and" to
-- strip; and --.

At column 24, line 17, change "to external" to
-- to an external --.

Signed and Sealed this

Seventh Day of March, 1989

Attest:

DONALD J. QUIGG

Attesting Officer

Commissioner of Patents and Trademarks